(12) United States Patent
Ono et al.

(10) Patent No.: US 12,594,883 B2
(45) Date of Patent: Apr. 7, 2026

(54) DISPLAY DEVICE FOR DISPLAYING PATHS OF A VEHICLE

(71) Applicants: Toyota Jidosha Kabushiki Kaisha, Toyota (JP); The University of Tokyo, Tokyo (JP)

(72) Inventors: Sayaka Ono, Mishima (JP); Yoshitaka Fuwamoto, Mishima (JP); Hitoshi Kumon, Aichi-gun (JP); Takayuki Iwamoto, Sunto-gun (JP); Hiroki Mori, Susono (JP); Takuji Narumi, Tokyo (JP); Shunsuke Kondo, Tokyo (JP); Tomohiro Tanikawa, Tokyo (JP); Michitaka Hirose, Tokyo (JP)

(73) Assignees: TOYOTA JIDOSHA KABUSHIKI KAISHA, Toyota (JP); THE UNIVERSITY OF TOKYO, Tokyo (JP)

( * ) Notice: Subject to any disclaimer, the term of this patent is extended or adjusted under 35 U.S.C. 154(b) by 353 days.

(21) Appl. No.: 16/270,926

(22) Filed: Feb. 8, 2019

(65) Prior Publication Data
US 2019/0248287 A1 Aug. 15, 2019

(30) Foreign Application Priority Data
Feb. 9, 2018 (JP) ................................. 2018-022473

(51) Int. Cl.
*B60Q 9/00* (2006.01)
*B60K 35/10* (2024.01)
(Continued)

(52) U.S. Cl.
CPC ................ *B60Q 9/00* (2013.01); *B60K 35/10* (2024.01); *B60K 35/22* (2024.01); *B60K 35/23* (2024.01);
(Continued)

(58) Field of Classification Search
CPC ........... B60W 30/00; B60W 2050/146; B60W 50/14; B60W 50/16; B60W 2550/10;
(Continued)

(56) References Cited

U.S. PATENT DOCUMENTS 9,008,890 B1 * 4/2015 Herbach ............... B60W 30/00
701/26
9,523,984 B1 * 12/2016 Herbach ............... B60W 30/09
(Continued)

FOREIGN PATENT DOCUMENTS

| CN | 104787042 A | 7/2015 |
| JP | H08178679 A | 7/1996 |
(Continued)

*Primary Examiner* — Jin Cheng Wang
(74) *Attorney, Agent, or Firm* — Dinsmore & Shohl LLP

(57) ABSTRACT

A display device includes a traveling state recognition unit configured to recognize a traveling state of a vehicle, an intervening driving manipulation recognition unit configured to recognize intervention in a driving manipulation by a driver of the vehicle during autonomous driving control, a trajectory acquisition unit configured to acquire a trajectory of the autonomous driving control, a first calculation unit configured to calculate a first path of the vehicle if an amount of intervention in the driving manipulation is maintained, a second calculation unit configured to calculate a second path of the vehicle due to the autonomous driving control based on the trajectory; and a display control unit configured to cause a first pointer showing the first path and a second pointer showing the second path to be displayed on an in-vehicle display when the intervention in the driving manipulation during the autonomous driving control is recognized.

24 Claims, 25 Drawing Sheets

(51) Int. Cl.

| | |
|---|---|
| *B60K 35/22* | (2024.01) |
| *B60K 35/23* | (2024.01) |
| *B60K 35/28* | (2024.01) |
| *B60K 35/29* | (2024.01) |
| *B60K 35/81* | (2024.01) |
| *G02B 27/01* | (2006.01) |
| *G05D 1/00* | (2024.01) |
| *G09G 5/00* | (2006.01) |

(52) U.S. Cl.

CPC ............. *B60K 35/28* (2024.01); *B60K 35/29* (2024.01); *B60K 35/81* (2024.01); *G02B 27/0101* (2013.01); *G09G 5/003* (2013.01); *G02B 2027/014* (2013.01); *G02B 2027/0141* (2013.01); *G05D 1/0212* (2013.01); *G09G 2380/10* (2013.01)

(58) Field of Classification Search

CPC ......... B60W 2540/04; B60W 2540/20; B60W 30/09; B60W 30/18163; B60W 30/182; B60W 40/09; B60W 50/08; B60W 50/10; B60W 30/08; B60W 30/0956; G01C 21/34; G01C 21/3605; G01C 21/3617; G05D 1/0212; G05D 1/0214; G05D 1/0231; G05D 1/0297; G05D 2201/0213; G05D 1/021; G05D 1/0088; G05D 1/0061; G05D 1/0223; G07C 5/008; G06F 3/14; G06F 3/048; G06K 9/00798; G06K 9/00805; G06K 9/00671; G06K 9/00791; G06K 9/00832; B60K 2370/175; B60K 2370/193

USPC ............................ 701/23, 538, 26, 301, 400
See application file for complete search history.

(56) References Cited

U.S. PATENT DOCUMENTS

| | | | |
|---|---|---|---|
| 2010/0001883 A1 | 1/2010 | Koenig | |
| 2013/0211656 A1* | 8/2013 | An ....................... | B62D 15/027 |
| | | | 701/25 |
| 2015/0149088 A1* | 5/2015 | Attard ................... | G01C 21/36 |
| | | | 701/538 |
| 2017/0320500 A1* | 11/2017 | Yoo ................. | B60W 30/18163 |
| 2017/0336629 A1 | 11/2017 | Suzuki et al. | |
| 2018/0058879 A1* | 3/2018 | Tayama ................ | B60W 30/12 |
| 2018/0059667 A1* | 3/2018 | Kuroda .............. | B60W 40/068 |
| 2018/0074497 A1* | 3/2018 | Tsuji ................... | B60W 50/085 |
| 2018/0126986 A1* | 5/2018 | Kim ................... | B60W 50/087 |
| 2018/0194280 A1* | 7/2018 | Shibata ............. | G01C 21/3484 |
| 2019/0047621 A1* | 2/2019 | Kim ....................... | G08G 1/167 |
| 2019/0092389 A1* | 3/2019 | McGill ................ | B60W 50/10 |
| 2019/0129831 A1* | 5/2019 | Goldberg ........... | G06F 3/04845 |
| 2019/0202479 A1* | 7/2019 | Beauvais ............. | B60W 50/14 |
| 2020/0156662 A1* | 5/2020 | Mimura ................ | B60K 35/00 |

FOREIGN PATENT DOCUMENTS

| | | |
|---|---|---|
| JP | H10105885 A | 4/1998 |
| JP | 2016215793 A | 12/2016 |
| JP | 2017182565 A | 10/2017 |
| JP | 2017-211366 A | 11/2017 |
| JP | 2017-218001 A | 12/2017 |

* cited by examiner

1

DISPLAY DEVICE FOR DISPLAYING PATHS OF A VEHICLE

CROSS-REFERENCE TO RELATED APPLICATION

This application claims the benefit of priority from Japanese Patent Application No. 2018-022473, filed Feb. 9, 2018, the entire contents of which are incorporated herein by reference.

TECHNICAL FIELD

The present disclosure relates to a display device.

BACKGROUND

In the related art, a technique for causing a predicted path of a vehicle to be displayed on an in-vehicle display is known as a technique regarding a display device (for example, Japanese Unexamined Patent Publication No. H08-178679). A technique for informing an occupant of a predicted path of a vehicle based on a trajectory of autonomous driving control of a vehicle is known (for example, Japanese Unexamined Patent Publication No. H10-105885).

SUMMARY

Meanwhile, in an autonomous driving control technique, enabling a driver to intervene in a driving manipulation in order to realize vehicle manipulation in which intention of the driver is reflected during autonomous driving control has been studied. In the intervention in the driving manipulation of the driver during such autonomous driving control, a display device is required to display appropriate information to the driver.

Therefore, in this technical field, a display device enabling a driver to easily comprehend a difference between a path of the vehicle due to intervention in a driving manipulation and a path of the vehicle due to autonomous driving control when the driver intervenes in the driving manipulation during the autonomous driving control is desired.

In order to solve the above problem, an aspect of the present disclosure is a display device that displays an image regarding autonomous driving control of an autonomous driving system on an in-vehicle display of a vehicle, based on information acquired from the autonomous driving system of the vehicle, the display device including: a traveling state recognition unit configured to recognize a traveling state of the vehicle; an intervening driving manipulation recognition unit configured to recognize intervention in a driving manipulation by a driver of the vehicle during the autonomous driving control; a trajectory acquisition unit configured to acquire a trajectory of the autonomous driving control from the autonomous driving system; a first calculation unit configured to calculate a first path that is a path of the vehicle in a case where an amount of intervention in the driving manipulation is maintained based on the traveling state and the driving manipulation; a second calculation unit configured to calculate a second path that is a path of the vehicle due to the autonomous driving control based on the trajectory; and a display control unit configured to cause a first pointer which is an image showing the first path and a second pointer which is an image showing the second path to be displayed on the in-vehicle display when the intervention in the driving manipulation during the autonomous driving control is recognized by the intervening driving manipulation recognition unit.

According to the display device of an embodiment of the present disclosure, the display control unit causes not only the second pointer which is an image showing the second path, but also the first pointer which is an image showing the first path to be displayed on the in-vehicle display, when the intervention in the driving manipulation during the autonomous driving control is recognized by the intervening driving manipulation recognition unit. Accordingly, the driver can visually recognize a difference between the first path and the second path. Therefore, the driver can easily comprehend a difference between the path of the vehicle due to the intervention in the driving manipulation and the path of the vehicle due to autonomous driving control, when the driver intervenes in the driving manipulation during the autonomous driving control.

In an embodiment, in the display device, the in-vehicle display may be an AR-HUD, and the display control unit may cause the first pointer and the second pointer to be displayed on the in-vehicle display and to be superimposed on a foreground landscape showing a situation in front of the vehicle when the intervention in the driving manipulation during the autonomous driving control is recognized by the intervening driving manipulation recognition unit. The first pointer and the second pointer can be displayed and superimposed on the forward landscape. Therefore, the first path and the second path are displayed, for example, as paths on the road in front of the vehicle, when viewed from the driver. Accordingly, the driver can easily comprehend the difference between the first path and the second path.

In an embodiment, in the display device, the first pointer may be displayed as a plurality of first pointer-constituents aligned along the first path, and the display control unit may cause the plurality of first pointer-constituents to be displayed so that an interval between the plurality of first pointer-constituents becomes short according to a manipulation-amount of a decelerating manipulation or a deceleration of the vehicle when the driving manipulation of the driver is the decelerating manipulation, and cause the plurality of first pointer-constituents to be displayed so that an interval between the plurality of first pointer-constituents becomes long according to a manipulation-amount of an accelerating manipulation or an acceleration of the vehicle when the driving manipulation of the driver is the accelerating manipulation. The driver can easily comprehend the change in the speed of the vehicle according to the driving manipulation as the interval between the first pointer-constituents along the first path.

In an embodiment, in the display device, the display control unit may cause a first predicted stop pointer indicating a first predicted stop position to be displayed on the in-vehicle display, when the driving manipulation of the driver is the decelerating manipulation, wherein the first predicted stop position is a predicted stop position of the vehicle when a manipulation-amount of a decelerating manipulation is maintained, and cause a second predicted stop pointer indicating a second predicted stop position that is a predicted stop position of the vehicle due to the autonomous driving control to be displayed on the in-vehicle display when the vehicle is stopped through the autonomous driving control. The driver can easily comprehend the predicted stop position of the vehicle due to driving manipulation and the predicted stop position of the vehicle due to autonomous driving control.

In an embodiment, in the display device, the first pointer may be displayed as a plurality of first pointer-constituents respectively corresponding to predicted positions on the first path of the vehicle at a plurality of future times at a predetermined time interval, and the second pointer may be displayed as a plurality of second pointer-constituents respectively corresponding to predicted positions on the second path of the vehicle at the plurality of future times. The driver can easily comprehend a transition of the predicted position of the vehicle according to the speed of the vehicle as a positional relationship between the first pointer-constituents on the in-vehicle display.

In an embodiment, in the display device, the first pointer may be displayed as a plurality of first pointer-constituents aligned along the first path, the second pointer may be displayed as a plurality of second pointer-constituents aligned along the second path, and the display control unit may cause the plurality of first pointer-constituents and the plurality of second pointer-constituents to be displayed on the in-vehicle display so that an interval between the plurality of first pointer-constituents becomes longer than an interval between the plurality of second pointer-constituents, when the intervention of the accelerating manipulation by the driver to accelerate the vehicle at an acceleration greater than an acceleration for acceleration through the autonomous driving control during the autonomous driving control is recognized by the intervening driving manipulation recognition unit in a case where the trajectory is a trajectory in which the vehicle accelerates through the autonomous driving control. The driver can easily comprehend a difference between the acceleration due to the manipulation by the driver and the acceleration due to the autonomous driving control.

In an embodiment, in the display device, the first pointer may be displayed as a plurality of first pointer-constituents aligned along the first path, the second pointer may be displayed as a plurality of second pointer-constituents aligned along the second path, and the display control unit may cause the plurality of first pointer-constituents and the plurality of second pointer-constituents to be displayed on the in-vehicle display so that an interval between the plurality of first pointer-constituents becomes shorter than an interval between the plurality of second pointer-constituents, when the intervention of the decelerating manipulation by the driver to decelerate the vehicle at a deceleration greater than a deceleration for deceleration through the autonomous driving control during the autonomous driving control is recognized by the intervening driving manipulation recognition unit in a case where the trajectory is a trajectory in which the vehicle decelerates through the autonomous driving control. The driver can easily comprehend a difference between the deceleration due to the manipulation by the driver and the deceleration due to the autonomous driving control.

In an embodiment, the display device may further include a degree-of-confidence acquisition unit configured to acquire a degree of system confidence of the autonomous driving control from the autonomous driving system, wherein the display control unit may change a display manner of the second pointer according to the degree of system confidence. The driver can easily comprehend the certainty of the second path according to the display manner of the second pointer.

In an embodiment, in the display device, the display control unit may cause the second pointer to be displayed as a main-display on the in-vehicle display during the autonomous driving control, and may cause the first pointer to be displayed as the main-display on the in-vehicle display and cause the second pointer to be displayed as a sub-display on the in-vehicle display when the intervention in the driving manipulation during the autonomous driving control is recognized by the intervening driving manipulation recognition unit. The first pointer is displayed as the main-display on the in-vehicle display when the intervention in the driving manipulation during the autonomous driving control is recognized by the intervening driving manipulation recognition unit. Therefore, the first pointer is more conspicuous than the second pointer. As a result, the driver can easily comprehend that the vehicle travels along the first path according to the intervention in the driving manipulation.

In an embodiment, in the display device, when a predetermined time has elapsed since the intervention in the driving manipulation has been recognized while the intervention in the driving manipulation during the autonomous driving control is recognized by the intervening driving manipulation recognition unit, the display control unit may cause the first pointer and the second pointer to be displayed on the in-vehicle display so that an emphasis-degree of the second pointer becomes weaker than before the predetermined time has elapsed since the intervention in the driving manipulation has been recognized. The driver can aware that the vehicle continues to follow intervention in the driving manipulation after the predetermined time has elapsed since the intervention in the driving manipulation has been recognized, while improving driver's awareness of the intervention in the driving manipulation, for example, by the driver comprehending the difference between the first path and the second path during a period from the recognition of the intervention in the driving manipulation to the lapse of the predetermined time.

In an embodiment, in the display device, the display control unit may cause a recommended return pointer indicating a position on the first path at which a return to the autonomous driving control is recommended to be displayed on the in-vehicle display, based on the first path and the second path, when the intervention in the driving manipulation during the autonomous driving control is recognized by the intervening driving manipulation recognition unit. The driver can easily comprehend the position on the first path at which the vehicle can smoothly return to the autonomous driving control, for example.

As described above, according to the various aspects and embodiments of the present disclosure, the driver can easily comprehend a difference between the path of the vehicle due to the intervention in the driving manipulation and the path of the vehicle due to autonomous driving control when the driver intervenes in the driving manipulation during the autonomous driving control.

DETAILED DESCRIPTION

Figure 1:
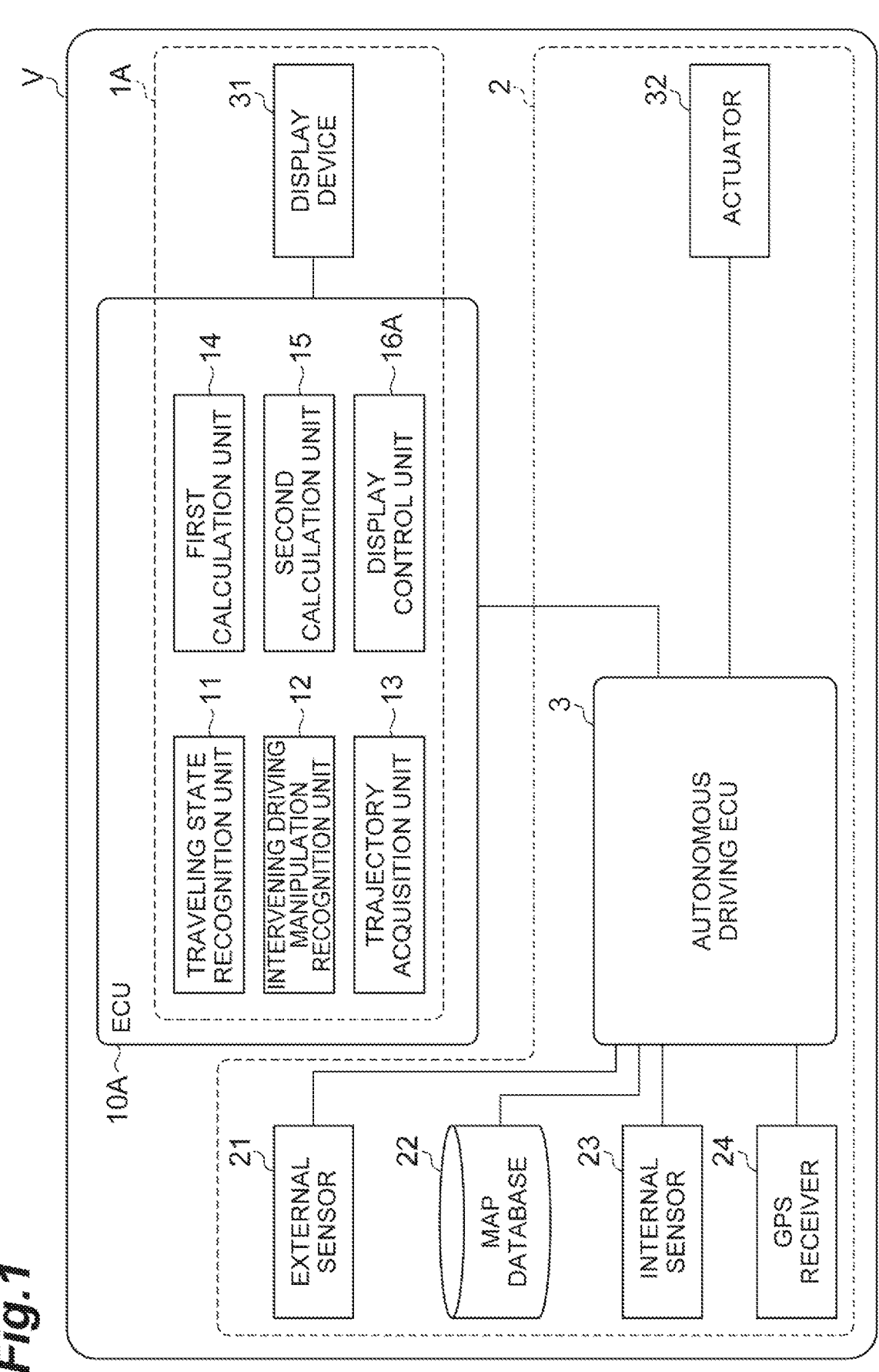
FIG. 1 is a block diagram illustrating a display device and an autonomous driving system according to a first embodiment.

Hereinafter, embodiments of the present disclosure will be described with reference to the drawings. In description of the drawings, the same elements are denoted by the same reference numerals, and duplicate description will be omitted.

First Embodiment

FIG. 1 is a block diagram illustrating a display device and an autonomous driving system according to a first embodiment. As illustrated in FIG. 1, a display device 1A and an autonomous driving system 2 are mounted on a vehicle V such as a passenger car.

[Configuration of Autonomous Driving System]

First, a configuration of the autonomous driving system 2 will be described. The autonomous driving system 2 is a system that executes autonomous driving control of the vehicle V. The autonomous driving control is vehicle control in which the vehicle V is autonomously traveled along a road on which the vehicle V travels without a driver principally performing a driving manipulation. The autonomous driving system 2 starts autonomous driving control of the vehicle V when the driver performs an autonomous driving control start manipulation (such as a manipulation for pressing an autonomous driving control start button). The autonomous driving system 2 at least temporarily deactivates the autonomous driving control and transitions to manual driving (override state) when intervention in the driving manipulation by the driver has been performed during autonomous driving control. The autonomous driving system 2 deactivates the override state and transitions (returns) to the autonomous driving control when a return manipulation (for example, a manipulation of pushing a return button for autonomous driving control or a manipulation of pushing a start button for autonomous driving control) is performed by the driver in a state in which a transition to the override state has been performed.

The autonomous driving system 2 includes an autonomous driving electronic control unit (ECU) 3, an external sensor 21, a map database 22, an internal sensor 23, a global positioning system (GPS) receiver 24, and an actuator 32.

The external sensor 21 is a detector that detects an object around the vehicle V. The object is a tangible object, and a preceding vehicle, a pedestrian, a stationary object such as a guardrail, or the like. As an example of the external sensor 21, a laser imaging detection and ranging (LIDAR) is used. The LIDAR detects an object around the vehicle V using laser light. As a specific example, the LIDAR transmits laser light in a radiation range around the vehicle V. When there is an object reflecting the laser light in the radiation range, the LIDAR acquires reflected light. The LIDAR detects a relative distance between the vehicle V and the object based on a time until radiated laser light returns as reflected light. The LIDAR detects a relative speed between the vehicle V and the object based on a change in frequency of the reflected light. The LIDAR detects a direction of the object based on an angle of the reflected light. The LIDAR transmits a detection result to the autonomous driving ECU 3. The external sensor 21 may use a millimeter wave radar or may use a camera. The external sensor 21 is also used for recognition of a white line of a travel lane on which the vehicle V travels. The external sensor 21 may recognize, for example, light color of a signal using a camera.

The map database 22 is a database having map information. The map database 22 is stored in a storage unit mounted in the vehicle V. The map information includes position information on a road, information on a road shape (for example, a type of curve or straight portion and a curvature of a curve), position information of an intersection and a branching point, and position information of a building, and the like. The map information may include position information of crosswalks, position information of stop lines, and the like. The map database 22 may be stored in a computer of a facility, such as an information processing center capable of communicating with the vehicle V.

The internal sensor 23 is a detector that detects a traveling state of the vehicle V and a driving manipulation of the driver of the vehicle V. The internal sensor 23 includes at least one of a vehicle speed sensor, an acceleration sensor, and a yaw rate sensor in order to detect the traveling state of the vehicle V. Further, the internal sensor 23 includes at least one of an accelerator pedal sensor, a brake pedal sensor, and a steering sensor in order to detect a driving manipulation of the driver.

The vehicle speed sensor is a detector that detects a speed of the vehicle V. As an example of the vehicle speed sensor, a wheel speed sensor that is provided in, for example, a wheel of the vehicle V or a drive shaft integrally rotated with the wheel and detects a rotation speed of the wheel is used. The vehicle speed sensor transmits the detected vehicle speed information of the vehicle V to the autonomous driving ECU 3. The acceleration sensor is a detector that detects the acceleration of the vehicle V. The acceleration sensor includes a longitudinal acceleration sensor that detects an acceleration in a longitudinal direction of the vehicle V, and a lateral acceleration sensor that detects an acceleration in a lateral direction of the vehicle V. The acceleration sensor transmits the detected acceleration information of the vehicle V to the autonomous driving ECU 3. The yaw rate sensor is a detector that detects a yaw rate (a rotational angular velocity) around a vertical axis of a centroid of the vehicle V. A gyro sensor is used as an example of the yaw rate sensor. The yaw rate sensor transmits the detected yaw rate information of the vehicle V to the autonomous driving ECU 3.

The accelerator pedal sensor is, for example, a detector that detects an amount of depression of the accelerator pedal. The amount of depression of the accelerator pedal is, for example, a position of the accelerator pedal (a pedal position) with reference to a predetermined position. The predetermined position may be a fixed position or may be a position changed according to a predetermined parameter. The accelerator pedal sensor is provided, for example, for a shaft portion of the accelerator pedal of the vehicle V. The accelerator pedal sensor outputs manipulation information according to the amount of depression of the accelerator pedal to the autonomous driving ECU 3.

The accelerator pedal sensor may detect the pedal position in which both the accelerator pedal operation and a system control input (a control target value) have been reflected when the pedal position of the accelerator pedal moves according to the control target value of the accelerator pedal included in the trajectory to be described below. The accelerator pedal sensor may detect the pedal position according to the manipulation of the accelerator pedal when the pedal position of the accelerator pedal does not move according to the control target value of the accelerator pedal included in the trajectory to be described below.

The brake pedal sensor is, for example, a detector that detects an amount of depression of the brake pedal. The amount of depression of the brake pedal is, for example, a position of the brake pedal (a pedal position) with reference to a predetermined position. The predetermined position may be a fixed position or may be a position changed according to a predetermined parameter. The brake pedal sensor is provided, for example, for a part of the brake pedal.

The brake pedal sensor may detect a manipulating force of the brake pedal (for example, a depression force with respect to the brake pedal or pressure of a master cylinder). The brake pedal sensor outputs manipulation information according to the amount of depression of the brake pedal or the manipulating force to the autonomous driving ECU 3.

The brake pedal sensor may detect a pedal position in which both a brake pedal manipulation and a system control input have been reflected when the pedal position of the brake pedal moves according to a control target value of the brake pedal included in the trajectory to be described below. The brake pedal sensor may detect the pedal position according to the brake pedal manipulation when the pedal position of the brake pedal does not move according to the control target value of the brake pedal included in the trajectory to be described below.

The steering sensor is, for example, a detector that detects a rotation state of a steering. A detected value of the rotational state is, for example, a steering torque or a steering angle. The steering sensor is provided, for example, for a steering shaft of the vehicle V. The steering sensor outputs information including a steering torque or a steering angle of the steering to the autonomous driving ECU 3.

The steering sensor may detect the torque or the steering angle in which both the steering manipulation and the system control input have been reflected when the steering rotates according to a control target value of the steering included in the trajectory to be described below. The steering sensor may detect the torque or the steering angle according to the steering manipulation when the steering does not rotate according to the control target value of the steering included in the trajectory to be described below.

The GPS receiver 24 receives signals from three or more GPS satellites and measures the position of the vehicle V. Specific examples of the position are latitude and longitude. The GPS receiver 24 transmits the measured position information of the vehicle V to the autonomous driving ECU 3.

The actuator 32 is a device that executes traveling control of the vehicle V. The actuator 32 includes an engine actuator, a brake actuator, and a steering actuator. The engine actuator changes an amount of supply of air to the engine according to a control signal from the autonomous driving ECU 3 to control driving force of the vehicle V. As a specific example, the engine actuator changes a throttle opening degree to control the driving force of the vehicle V. If the vehicle V is a hybrid vehicle or an electric vehicle, the engine actuator controls the driving force of a motor serving as a power source. The brake actuator controls a brake system according to a control signal from the autonomous driving ECU 3 and controls the braking force to be applied to the wheel of the vehicle V. As a brake system, a hydraulic brake system can be used. The steering actuator controls driving of an assistance motor for controlling the steering torque in an electric power steering system according to a control signal from the autonomous driving ECU 3. Accordingly, the steering actuator controls the steering torque of the vehicle V.

The autonomous driving ECU 3 is an electronic control unit including a central processing unit (CPU), a read only memory (ROM), a random access memory (RAM), a controller area network (CAN) communication circuit, and the like. The autonomous driving ECU 3 controls hardware based on a signal that is output by the CPU and realizes a function of the autonomous driving ECU 3 to be described below. As an example of a more specific operation, the autonomous driving ECU 3 operates the CAN communication circuit to input and output data, stores input data in the RAM, loads a program stored in the ROM into the RAM, and executes the program loaded into the RAM.

The autonomous driving ECU 3 is configured to be able to refer to the map database 22. The autonomous driving ECU 3 generates a trajectory (traveling plan) for causing the vehicle V to travel to a destination through autonomous driving control based on the map information in the map database 22. The destination may be a destination set by the driver or may be a destination proposed by the autonomous driving system 2.

The trajectory includes a steering plan regarding the steering of the vehicle V and a vehicle speed plan regarding the vehicle speed of the vehicle V. The steering plan includes a target steering angle according to a position on a path on which the vehicle V travels through the autonomous driving control. The position on the path is a position in an extending direction of the path (that is, a target route of the autonomous driving control) on a map. Specifically, the position on the path can be a set longitudinal position set at predetermined intervals (for example, 1 m) in a direction in which the path extends. The target steering angle is a value that is a control target of the steering angle of the vehicle V in the trajectory. The autonomous driving ECU 3 generates a steering plan by setting a target steering angle for each position separated by a predetermined distance on the path. A target steering torque or a lateral target position (a position in a width direction of a road that is a target of the vehicle V) may be used instead of the target steering angle. As the steering plan, a target path-line may be set.

The vehicle speed plan includes a target vehicle speed corresponding to the position on the path on which the vehicle V travels through autonomous driving control. The target vehicle speed is a value that is a control target of the vehicle speed of the vehicle V in the driving plan. The autonomous driving ECU 3 generates a vehicle speed plan by setting a target vehicle speed for each position separated by a predetermined distance on the path. A target acceleration or a target jerk may be used instead of the target vehicle speed. A time may be used as a reference instead of the position on the path (the set longitudinal position).

Further, the autonomous driving ECU 3 acquires a road environment (including information on objects) around the vehicle V from a detection result of the external sensor 21. The autonomous driving ECU 3 acquires information on the traveling state of the vehicle V from a detection result of the internal sensor 23. The autonomous driving ECU 3 acquires the position information of the vehicle V from a measurement result of the GPS receiver 24.

The autonomous driving ECU 3 is connected to the actuator 32 and controls the actuator 32 to perform autonomous driving control of the vehicle V. The autonomous driving ECU 3 controls the actuator 32 based on the trajectory in which the vehicle V travels to a destination, a road environment around the vehicle V, the traveling state of the vehicle V, and the position information of the vehicle V, thereby performing autonomous driving control of the vehicle V. In the autonomous driving control, the vehicle V is autonomously traveled along a road on which the vehicle V travels. The autonomous driving control includes autonomous steering and autonomous speed adjustment. The autonomous steering is a control for autonomously performing steering of the vehicle V. The autonomous speed adjustment is a control for autonomously adjusting the speed of the vehicle V. Although the configuration of the autonomous driving system 2 has been described above, the autonomous driving system 2 is not limited to the above-described configuration. It is possible to adopt a well-known configuration as the autonomous driving system 2 except for the display device 1A.

[Configuration of Display Device]

Next, a configuration of the display device 1A according to the present embodiment will be described. The display device 1A displays an image regarding the autonomous driving control of the autonomous driving system 2 on a display device (an in-vehicle display) 31 to be described below of the vehicle V based on information acquired from the autonomous driving system 2 of the vehicle V. The information acquired from the autonomous driving system 2 includes information on the trajectory described above. At least one of the map information in the map database 22, the information on the traveling state (vehicle speed information, acceleration information, and yaw rate information) of the vehicle V detected by the internal sensor 23, the manipulation information of the driving manipulation of the driver, and the position information of the vehicle V measured by the GPS receiver 24 may be included in the information acquired from the autonomous driving system 2.

The display device 1A includes at least a part of the ECU 10A mounted on the vehicle V, and a display device 31. The ECU 10A is an electronic control unit including a CPU, a ROM, a RAM, a CAN communication circuit, and the like. The ECU 10A controls the display device 31. The ECU 10A may be an electronic control unit built into the display device 31.

The display device 31 is a display that is mounted on the vehicle and displays an image in a display area. The image is an image that is displayed in the display area. The display device 31 is controlled by the ECU 10A to display the image in the display area. For example, a display capable of displaying colors is used as the display device 31.

A head up display (HUD) is used as an example of the display device 31. The head up display is a display for superimposing visual information on a field of view of the driver of the vehicle V. The head up display has a projection unit installed in an instrument panel of the vehicle V. The projection unit irradiates a display surface of a front windshield (a reflection surface on the inner side of the front windshield) with an image through an opening portion provided in the instrument panel. The driver can visually recognize the image based on the reflection on the display surface. The display area of the head up display is an area preset in the front windshield, and is a range which is irradiated with the image. The display device 31 is, for example, configured as an AR-HUD that irradiates the display surface of the front windshield with an image using an augmented reality (AR) technique.

A liquid crystal display (so-called multi information display (MID)) provided on the instrument panel or a liquid crystal display of a navigation system may be used as the display device 31. In this case, the display surface is a display surface of the liquid crystal display.

Hereinafter, a function of the ECU 10A will be described. As illustrated in FIG. 1, the ECU 10A includes a traveling state recognition unit 11, an intervening driving manipulation recognition unit 12, a trajectory acquisition unit 13, a first calculation unit 14, a second calculation unit 15, and a display control unit 16A. Some of functions of the ECU 10A may be realized by using an electronic control unit built in the display device 31.

The traveling state recognition unit 11 recognizes a traveling state of the vehicle V based on the detection result of the internal sensor 23. The traveling state includes, for example, the vehicle speed of the vehicle V, the acceleration of the vehicle V, and the yaw rate of the vehicle V. Specifically, the traveling state recognition unit 11 recognizes the vehicle speed of the vehicle V based on the vehicle speed information of the vehicle speed sensor. The traveling state recognition unit 11 recognizes the acceleration of the vehicle V based on the acceleration information of the acceleration sensor. The traveling state recognition unit 11 recognizes the direction of the vehicle V based on the yaw rate information of the yaw rate sensor.

The intervening driving manipulation recognition unit 12 recognizes the intervention in the driving manipulation of the driver of the vehicle V during the autonomous driving control based on the manipulation information of the driving manipulation of the driver acquired from the autonomous driving system 2. The intervention in the driving manipulation means intervention of a manipulation for the driver temporarily deactivating the autonomous driving control or reflecting manual driving in traveling of the vehicle V as a background process. For example, the intervening driving manipulation recognition unit 12 recognizes the intervention in the driving manipulation when an amount of intervention (for example, the steering torque or the steering angle) of the manipulation of the steering wheel by the driver exceeds a predetermined value during the autonomous driving control. For example, the intervening driving manipulation recognition unit 12 recognizes the intervention in the driving manipulation when the amount of intervention (for example, the amount of depression) of the manipulation of the accelerator pedal or the brake pedal by the driver exceeds a predetermined value during the autonomous driving control. As the amount of intervention of each driving manipulation, a current value of the steering torque, the steering angle, or the amount of depression may be used, or a time differential value may be used.

The trajectory acquisition unit 13 acquires a trajectory for autonomous driving control from the autonomous driving system 2. The trajectory acquisition unit 13 acquires a steering plan and a vehicle speed plan at least in a predetermined future period from the autonomous driving system 2. The future period is a period in the future from a current time to a time after the lapse of a predetermined time. The future period may include a plurality of future times at predetermined time intervals. The predetermined time interval is not particularly limited, but can be set to, for example, 1 second. The predetermined time interval may be 0.5 seconds, may be two seconds, or may be three seconds.

The first calculation unit 14 calculates the first path based on the information on the traveling state of the vehicle V acquired from the autonomous driving system 2, the position information on the vehicle V, and the manipulation information on the driving manipulation of the driver. The first path is a path of the vehicle V in a case where the amount of intervention in the driving manipulation is maintained. "The case where the amount of intervention in the driving manipulation is maintained" is a case where the amount of intervention (for example, the steering angle at the time of computation) of the driving manipulation at the time of calculating the first path in the first calculation unit 14 is maintained. "The case where the amount of intervention in the driving manipulation is maintained" may be a case where a temporal differential value of the amount of intervention in the driving manipulation (for example, a steering angular velocity at the time of calculation) at the time of calculating the first path in the first calculation unit 14 is maintained.

The first path is a predicted path (a predicted path-line) from a current position predicted to be followed by the vehicle V according to the driving manipulation of the driver. The first path can be a predicted path in a predetermined period (for example, a future period). The first path includes, for example, predicted positions of the vehicle V at which the vehicle V is predicted to be located at a plurality of future times. The predicted position is defined, for example, by using a predicted longitudinal position at which the vehicle V is predicted to be located in a direction in which the path extends (that is, a target route of the autonomous driving control) at a plurality of future times, and a predicted lateral position at which the vehicle V is predicted to be located in a width direction of a road that is a target of the vehicle V at a plurality of future times.

The second calculation unit 15 calculates the second path based on the trajectory acquired from the autonomous driving system 2. The second path is a path of the vehicle V according to autonomous driving control. The second calculation unit 15 calculates the second path when the intervention of the driver is not recognized by the intervening driving manipulation recognition unit 12 during the autonomous driving control. The second calculation unit 15 continues the calculation of the second path when the intervention in the driving manipulation of the driver is recognized by the intervening driving manipulation recognition unit 12 during the autonomous driving control.

The second path is a target path (a target path-line) from a current position that is controlled to be followed by the vehicle V through the autonomous driving control. The second path can be a target path in a predetermined period (for example, the future period). The second path includes, for example, target positions at a plurality of future times of the vehicle V controlled through the autonomous driving control. The target position is defined, for example, by using a longitudinal target position set for each of a plurality of future times in the direction in which the path extends, and a lateral target position set for each of a plurality of future times in the width direction of the road of the target of the vehicle V.

The display control unit 16A controls the display of the display device 31. The display control unit 16A determines whether or not the intervention in the driving manipulation during the autonomous driving control is recognized based on the recognition result of the intervening driving manipulation recognition unit 12. The display control unit 16A causes a first pointer P1 and a second pointer P2 to be displayed on the display device 31 when the intervening driving manipulation recognition unit 12 recognizes the intervention in the driving manipulation during the autonomous driving control. The first pointer P1 and the second pointer P2 can be displayed, for example, in a range in which an image can be displayed on the display device 31. The range in which the image can be displayed means a range in which the display device 31 as hardware can display an image. The first pointer P1 and the second pointer P2 may be displayed in a part of a range in which an image can be displayed on the display device 31.

The first pointer P1 is an image showing the first path on the display device 31. The first pointer may be an image from which the driver can recognize the first path. The first pointer P1 can be an image showing a line extending along the first path from the position of the vehicle V on the display device 31 or an image showing a sequence of points arranged to be aligned along the first path on the display device 31. The first pointer P1 is an example of the sequence of points, and is displayed on the display device 31 as a plurality of first pointer-constituents respectively corresponding to predicted positions on the first path of the vehicle V at a plurality of future times. A shape of the first pointer-constituent may be, for example, a triangle displayed so that only one vertex is located in a traveling direction of the vehicle V.

The second pointer P2 is an image showing the second path on the display device 31. The second pointer may be an image from which the driver can recognize the second path. The second pointer P2 can be an image showing a line extending along the second path from the position of the vehicle V on the display device 31 or an image showing a sequence of points arranged to be aligned along the second path on the display device 31. The second pointer P2 is an example of the sequence of points, and is displayed on the display device 31 as a plurality of second pointer-constituents respectively corresponding to predicted positions on the second path of the vehicle V at a plurality of future times. A shape of the second pointer-constituent may be, for example, a triangle displayed so that only one vertex is located in the traveling direction of the vehicle V.

The display control unit 16A causes the second pointer-constituents as a main-display to be displayed on the display device 31 during autonomous driving control. The main-display is a display for causing the driver to recognize that a path on which the vehicle V actually travels is shown.

For example, when the intervention in the driving manipulation is not recognized by the intervening driving manipulation recognition unit 12 during the autonomous driving control, the display control unit 16A may cause the second pointer-constituents to be displayed on the display device 31 in a main-display-manner. The main-display-manner is a display manner in which stimulus to the driver's vision is relatively strong so that the driver can recognize that the image displayed on the display device 31 is the main-display. The main-display-manner may be a preset display manner of an image. The main-display-manner may be a manner in which color, shape, height (an apparent height in the case of a 3D display) of the first pointer-constituents or the second pointer-constituents, an interval between the first pointer-constituents, an interval between the second pointer-constituents, transparency, a degree of blurring, how to change a display position, or the like is changed so that stimulus to driver's vision is relatively strong. The main-display-manner may include, for example, a manner of displaying an image in color such as red, orange, yellow, yellow green, or light blue, a manner of displaying an image with high luminance, or a manner of displaying an image with flickering.

The display control unit 16A may cause the display device 31 to display the second pointer-constituents as a main-display so that the second pointer-constituents can be visually recognized. In this case, the display control unit 16A may cause the display device 31 to display a layer displaying the first pointer-constituents so that the layer displaying the first pointer-constituents become layer lower than a layer displaying the second pointer-constituents. The display control unit 16A may cause the first pointer-constituents and the second pointer-constituents to be overlapped and displayed on the display device 31 so that the first pointer-constituents are hidden in the second pointer-constituents.

The display control unit 16A causes the first pointer-constituents to be displayed on the display device 31 as the main-display and causes the second pointer-constituents to be displayed on the display device 31 as a sub-display when the intervention in the driving manipulation is recognized by the intervening driving manipulation recognition unit 12 during the autonomous driving control. The sub-display is a display for causing the driver to recognize an image displayed separately from the main-display on the display device 31, which is a collateral image following main-display.

For example, the display control unit 16A may cause the first pointer-constituents to be displayed on the display device 31 in the main-display-manner described above and cause the second pointer-constituents to be displayed on the display device 31 in a sub-display-manner, when the intervention in the driving manipulation is recognized by the intervening driving manipulation recognition unit 12 during the autonomous driving control. The sub-display-manner is a display manner in which stimulus to the driver's vision is suppressed as compared with the main-display-manner so that the driver can recognize that the image displayed on the display device 31 is the sub-display. The sub-display-manner may be a preset display manner of an image. The sub-display-manner may be a manner in which color, shape, height (an apparent height in the case of a 3D display) of the first pointer-constituents or the second pointer-constituents, an interval between the first pointer-constituents, an interval between the second pointer-constituents, transparency, a degree of blurring, how to change a display position, or the like is changed so that stimulus to driver's vision is suppressed as compared with the main-display-manner. The sub-display-manner includes, for example, a manner of displaying an image in color such as blue, dark green, purple, gray, or the like, a manner of displaying an image with lower luminance than in the main-display-manner, and a manner of displaying an image without flickering in a case in which an image is displayed with flickering as the main-display-manner.

The display control unit 16A may cause the display device 31 to display the layer displaying the first pointer-constituents so that the layer displaying the first pointer-constituents become layer higher than the layer displaying the second pointer-constituents when the intervention in the driving manipulation is recognized by the intervening driving manipulation recognition unit 12 during the autonomous driving control as the sub-display. In the case where the first pointer-constituent overlaps the second pointer-constituent, an overlapping portion of the second pointer-constituent may be hidden in the first pointer-constituent.

[Display Example of Display Device 1A]

Figure 2:
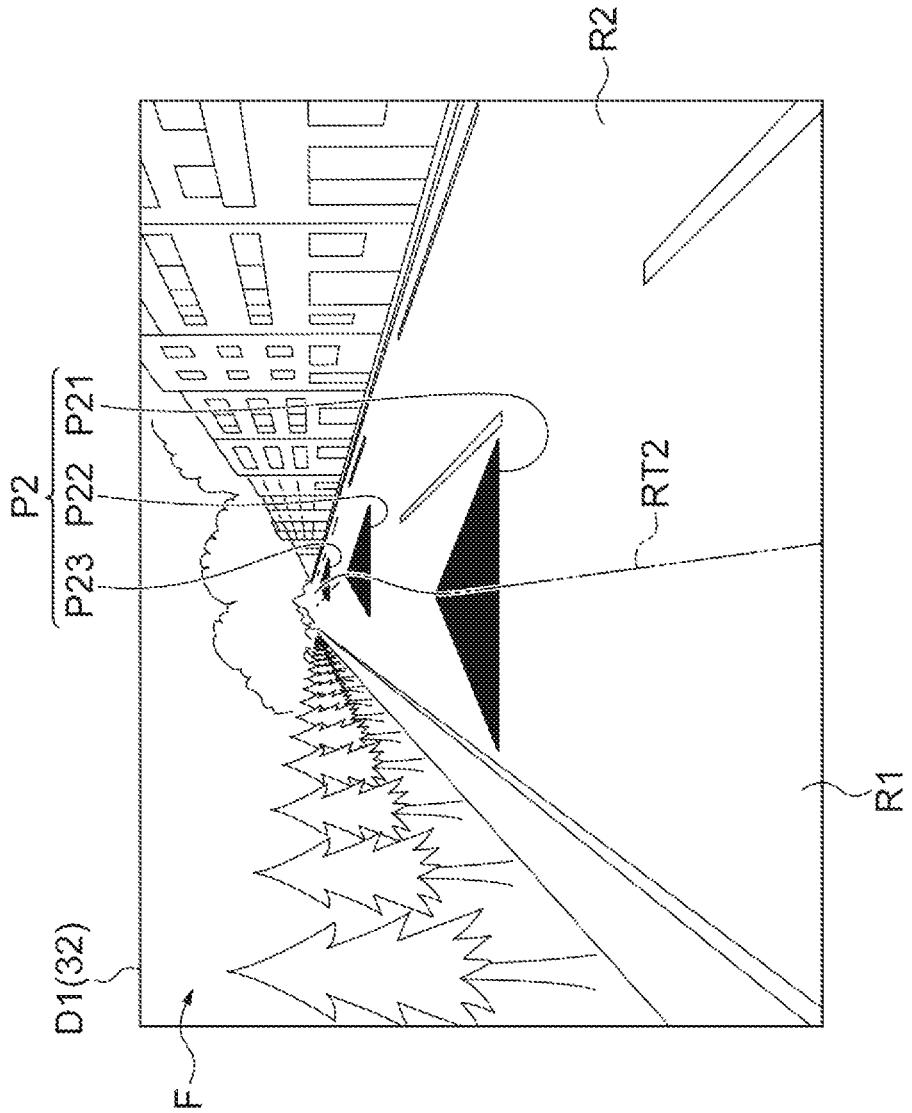
FIG. 2 illustrates an example of a display on an AR-HUD in the display device of FIG. 1 during autonomous driving control.
Figure 3:
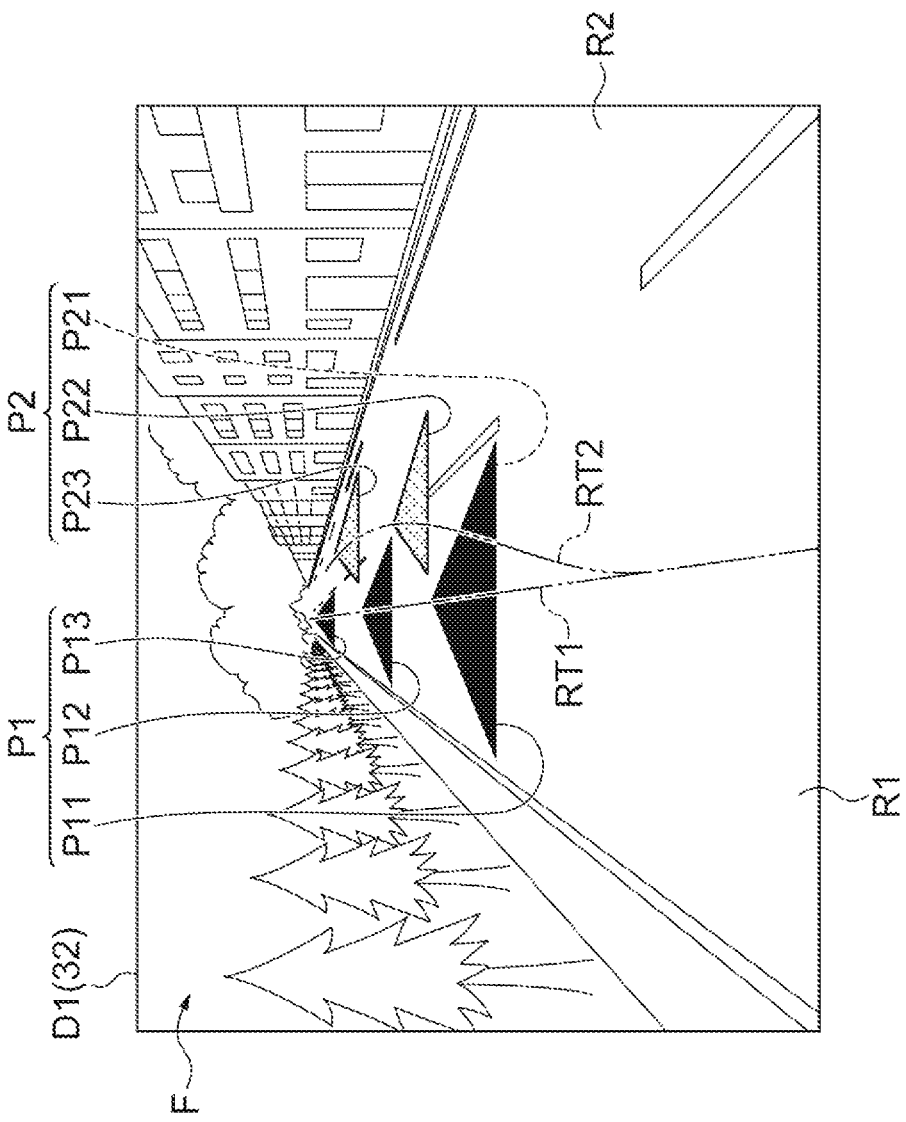
FIG. 3 is a display example showing a situation in which intervention in a driving manipulation is performed following the display example of FIG. 2.
Figures 4A, 4B:
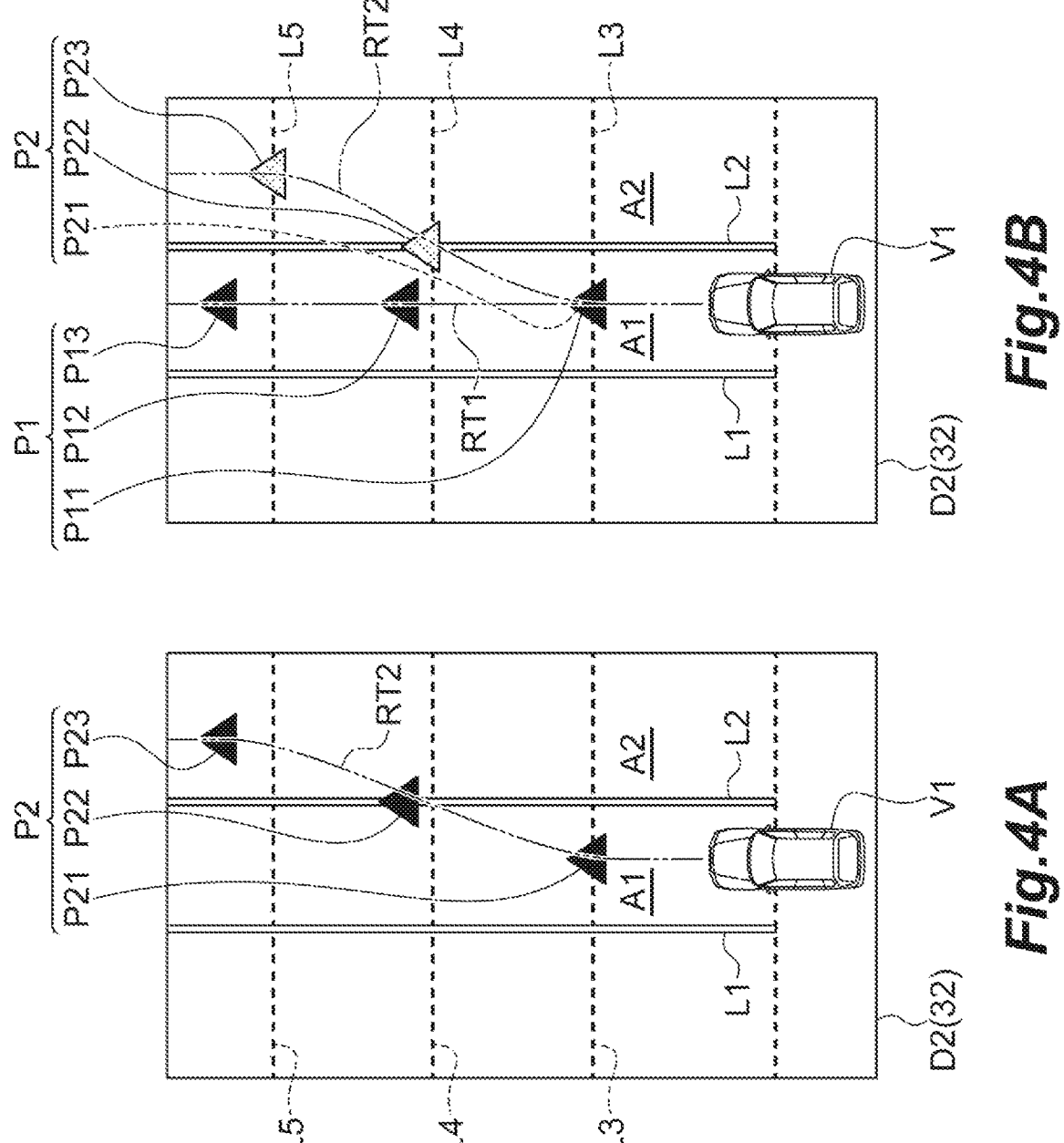
FIG. 4A illustrates an example of a display on an MID by the display device of FIG. 1 during autonomous driving control.
FIG. 4B is a display example showing a situation in which intervention in a driving manipulation is performed following the display example of FIG. 4A.

Here, FIG. 2 illustrates an example of a display on the AR-HUD in the display device 1A during autonomous driving control. FIG. 3 is a display example showing a situation in which intervention in a driving manipulation is performed following the display example of FIG. 2. FIG. 4A illustrates another example of a display on the MID in the display device 1A. FIG. 4B is a display example showing a situation following the display example of FIG. 4A.

Here, as an example, a situation in which the driver intervenes in the driving manipulation so that the first path RT1 stays in the travel lane R1 (so as not to let the vehicle V change the lane) when the trajectory is a trajectory of the second path RT2 in which lane change from the travel lane R1 to the adjacent lane R2 is performed through autonomous driving control will be described.

FIGS. 2 and 3 illustrate display examples of the first pointer-constituents and the second pointer-constituents when the display device 31 is an AR-HUD. In FIGS. 2 and 3, a foreground landscape F showing a situation in front of the vehicle V is displayed in a display area D1 of the display device 31. In the display area D1, a travel lane R1 on which the vehicle V is traveling is shown, and an adjacent lane R2 adjacent on the right side of the travel lane R1 is shown. As an example, the display control unit 16A causes the first pointer-constituents P11, P12, and P13 and the second pointer-constituents P21, P22, and P23 to be displayed on the display device 31 so that the first pointer-constituents P11, P12, and P13 and the second pointer-constituents P21, P22, and P23 are superimposed on the foreground landscape showing the situation in front of the vehicle V, when intervention in a driving manipulation during autonomous driving control is recognized by the intervening driving manipulation recognition unit 12.

As illustrated in FIGS. 2 and 4A, the display control unit 16A causes the second pointer-constituents P21, P22, and P23 to be displayed on the display device 31 in association with predicted positions on the second path RT2 of the vehicle V at future times t1, t2, and t3. The future times t1, t2, and t3 are, for example, future times at predetermined time intervals dt. For example, assuming that a current time in FIGS. 2 and 4A is tc1, the future time t1 is represented by tc1+dt, the future time t2 is represented by tc1+2dt, and the future time t3 is represented by tc1+3dt (hereinafter, the same applies to FIGS. 5 and 7A, 8, 10A, 16, 18A, 22, and 24A).

As illustrated in FIGS. 3 and 4B, the display control unit 16A causes the first pointer-constituents P11, P12, and P13 to be displayed on the display device 31 in association with predicted positions on the first path RT1 of the vehicle V at future times t4, t5, and t6. Similarly, the display control unit 16A causes the second pointer-constituents P21, P22, and P23 to be displayed on the display device 31 in association with predicted positions on the second path RT2 of the vehicle V at the future times t4, t5, and t6. Assuming that a current time in FIGS. 3 and 4B is time tc2 subsequent to time tc1, the future time t4 is represented by tc2+dt, the future time t5 is represented by tc2+2dt, and the future time t6 is represented by tc2+3dt (hereinafter, the same applies to FIGS. 6 and 7B, 9, 10B, 17, 18B, 23, and 24B).

For example, FIG. 2 illustrates a situation in which the intervention in the driving manipulation is not recognized by the intervening driving manipulation recognition unit 12 during autonomous driving control. In this situation, the second pointer-constituents P21, P22, and P23 are superimposed on the foreground landscape F and displayed on the display device 31. Specifically, the second pointer-constituents P21, P22, and P23 are displayed in the main-display-manner to move from the travel lane R1 to the adjacent lane R2 along the second path RT2. Accordingly, it is indicated that the trajectory is a trajectory in which the lane change is performed from the travel lane R1 to the adjacent lane R2 through the autonomous driving control. In the following description, "an interval between the predicted positions on the first path RT1 of the vehicle V" when the second pointer-constituents are displayed in a bird's-eye view on the display device 31 (for example, when the display device 31 is a head up display) means an interval (a distance) between actual positions on the first path RT1 of the vehicle V, not an interval between positions on the display device 31 including an influence of a perspective. The same applies to the interval between the predicted positions on the second path RT2.

In the example of FIG. 2, for convenience of illustration, the second pointer-constituents P21, P22, and P23 are displayed in black as a main-display-manner (hereinafter, the same applies to FIGS. 4A, 5, 7A, 8 and 10A).

FIG. 3 illustrates a situation in which the intervention in the driving manipulation has been recognized by the intervening driving manipulation recognition unit 12 during autonomous driving control. In this situation, the first pointer-constituents P11, P12, and P13 and the second pointer-constituents P21, P22, and P23 are superimposed on the foreground landscape F and displayed on the display device 31. Specifically, the first pointer-constituents P11, P12, and P13 are displayed in the main-display-manner to stay on the travel lane R1 along the first path RT1. The second pointer-constituents P21, P22, and P23 are displayed in a sub-display-manner to move from the travel lane R1 to the adjacent lane R2 along the second path RT2. Accordingly, it is indicated that the driver intervenes in the driving manipulation so that the first path RT1 stays in the travel lane R1.

In the example of FIG. 3, for convenience of illustration, the first pointer-constituents P11, P12, and P13 are displayed in black as a main-display-manner. In the example of FIG. 3, for convenience of illustration, the second pointer-constituents P21, P22, and P23 are displayed by hatching as a sub-display-manner (hereinafter, the same applies to 4B, 6, 7B, 9, 10B, 16, 18A, 22, 23, 24A, and 24B).

In FIGS. 2 and 3, the display manner of the first pointer-constituents P11, P12, and P13 after the intervention in the driving manipulation is recognized by the intervening driving manipulation recognition unit 12 is the same as the display manner of the second pointer-constituents P21, P22, and P23 before the intervention in the driving manipulation is recognized by the intervening driving manipulation recognition unit 12 (hereinafter, the same applies to FIGS. 4A and 4B, 5 and 6, 7A and 7B, 8 and 9, 10A and 10B).

Subsequently, as illustrated in FIGS. 4A and 4B, display examples in the situation illustrated in FIGS. 2 and 3 when the display device 31 is an MID will be described. FIGS. 4A and 4B illustrate display examples of the first pointer-constituents and the second pointer-constituents when the display device 31 is the MID. In FIGS. 4A and 4B, the first path RT1 and the second path RT2 are displayed in a display area D2 of the display device 31. In the display area D2, for example, an icon VI of the vehicle V, a pair of straight lines (vertical lines) L1 and L2, and a plurality of dashed lines (horizontal lines) L3, L4, and L5 are shown. The icon VI is a display on the display device 31 corresponding to a current position on a map of the vehicle V. The straight lines L1 and L2 are displayed on the display device 31 corresponding to a pair of lane marks defining the travel lane R1. The straight lines L1 and L2 define an area A1 corresponding to the travel lane R1 on the display device 31. The dashed lines L3, L4, and L5 are displays on the display device 31 corresponding to a plurality of positions on the map spaced by predetermined distance intervals in a traveling direction of the vehicle V from the current position on the map of the vehicle V. The dashed lines L3, L4, and L5 are spaced by predetermined distance intervals from the icon VI in a front-back direction of the icon VI. An area A2 corresponding to the adjacent lane R2 is defined on the right side of an illustrated paper surface of the straight line L2 (on the side opposite to the straight line L1).

First, FIG. 4A illustrates a situation in which the intervention in the driving manipulation is not recognized by the intervening driving manipulation recognition unit 12 during autonomous driving control. In this situation, the second pointer-constituents P21, P22, and P23 are displayed on the display device 31. Specifically, the second pointer-constituents P21, P22, and P23 are displayed in the main-display-manner to move from the area A1 to the area A2 across the straight line L2 along the second path RT2. Accordingly, it is indicated that the trajectory is a trajectory in which the lane change is performed from the travel lane R1 to the adjacent lane R2 through the autonomous driving control.

FIG. 4B illustrates a situation in which the intervention in the driving manipulation is recognized by the intervening driving manipulation recognition unit 12 during autonomous driving control. In this situation, the first pointer-constituents P11, P12, and P13 and the second pointer-constituents P21, P22, and P23 are displayed on the display device 31. Specifically, the first pointer-constituents P11, P12, and P13 are displayed in the main-display-manner to stay on the area A1 along the first path RT1. The second pointer-constituents P21, P22, and P23 are displayed in the sub-display-manner to move from the area A1 to the area A2 across the straight line L2 along the second path RT2. Accordingly, it is indicated that the driver intervenes in the driving manipulation so that the first path RT1 stays in the travel lane R1.

Figure 5:
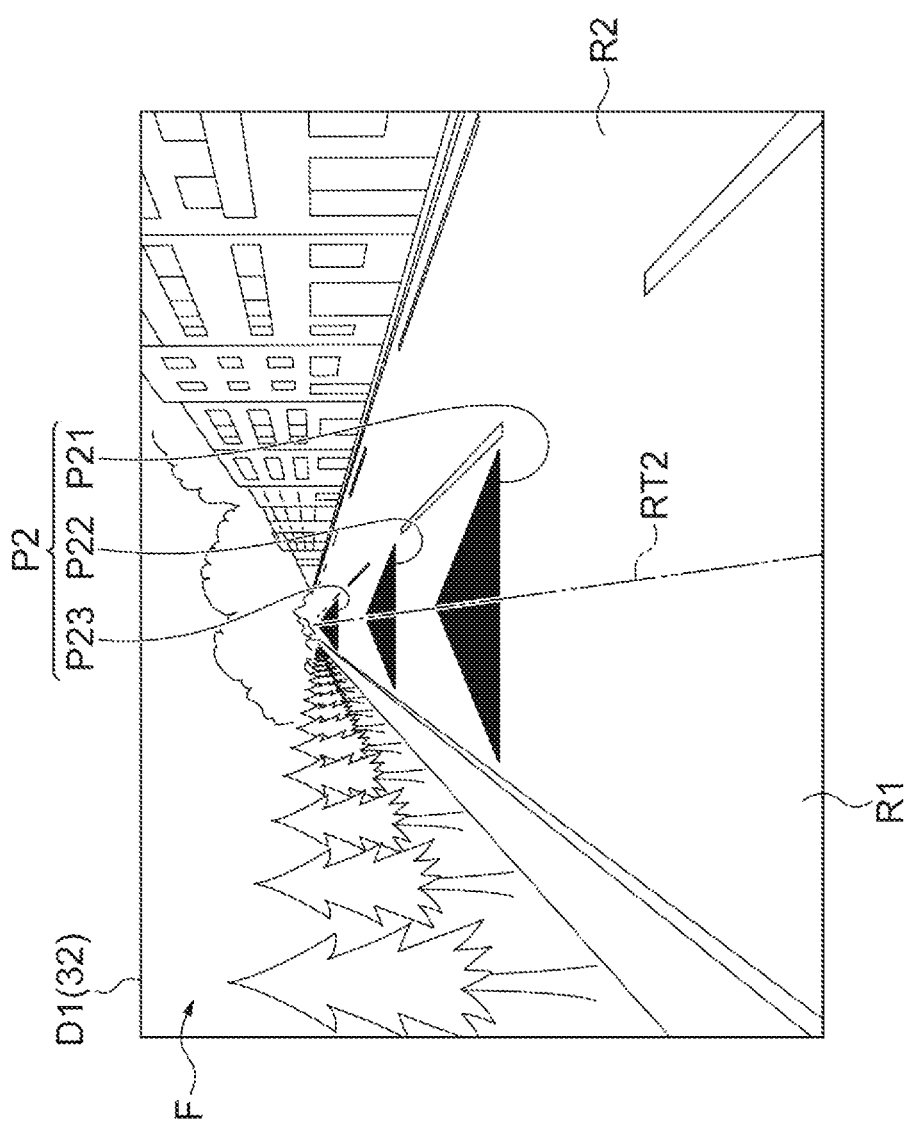
FIG. 5 illustrates another example of a display on an AR-HUD in the display device of FIG. 1 during autonomous driving control.
Figure 6:
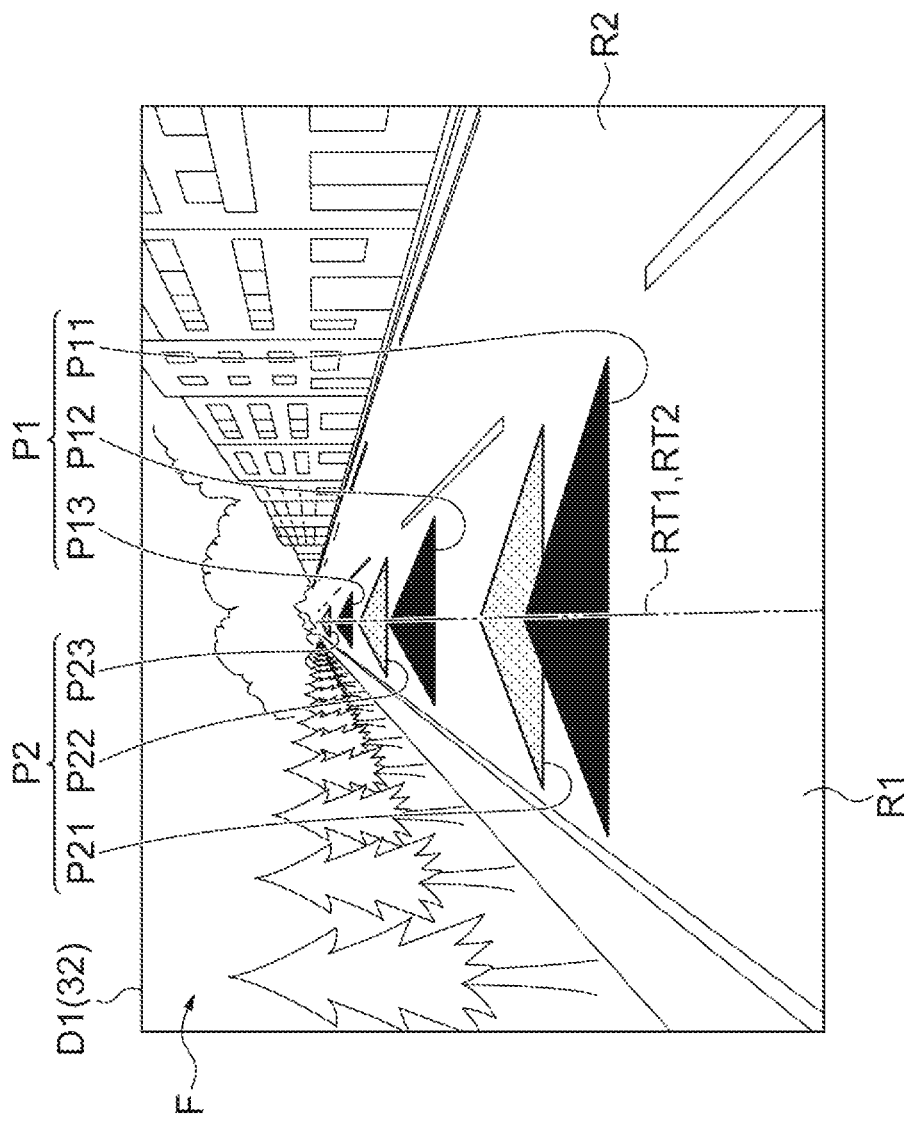
FIG. 6 is a display example showing a situation in which intervention in a driving manipulation is performed following the display example of FIG. 5.
Figures 7A, 7B:
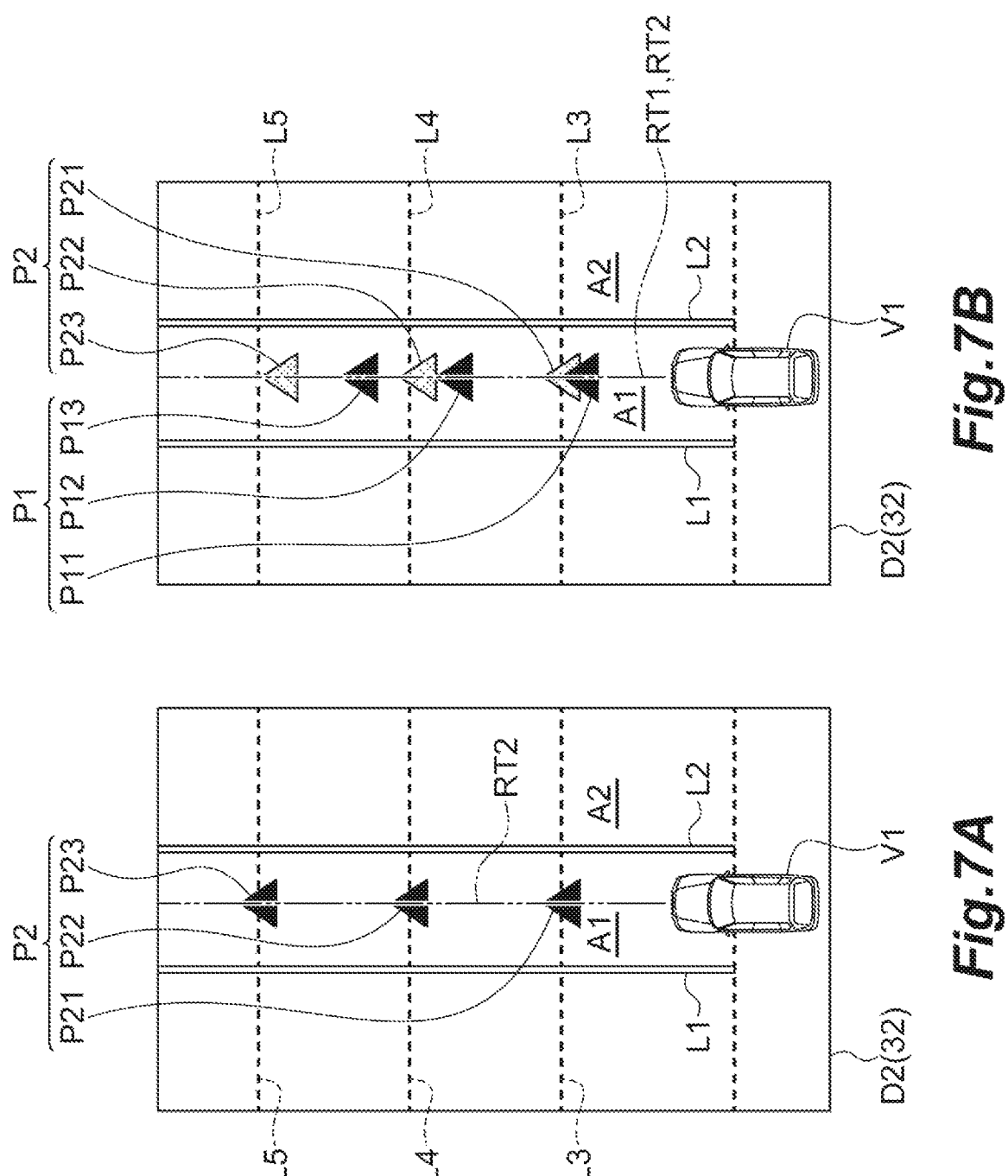
FIG. 7A illustrates another example of a display on an MID in the display device of FIG. 1 during autonomous driving control.
FIG. 7B is a display example showing a situation in which intervention in a driving manipulation is performed following the display example of FIG. 7A.

Next, FIG. 5 illustrates another example of a display on the AR-HUD in the display device 1A during the autonomous driving control. FIG. 6 is a display example showing a situation in which intervention in a driving manipulation is performed following the display example of FIG. 5. FIG. 7A illustrates another example of a display on the MID in the display device 1A. FIG. 7B is a display example showing a situation following the display example of FIG. 7A.

A situation in which the driver intervenes in a decelerating manipulation so that the vehicle V decelerates at a deceleration higher than a certain deceleration, for example, when the trajectory is a trajectory in which the vehicle V traveling on the travel lane R1 at the substantially constant vehicle speed through the autonomous driving control decelerates at the certain deceleration will be described herein.

For example, FIG. 5 illustrates a situation in which intervention of the decelerating manipulation is not recognized by the intervening driving manipulation recognition unit 12 during the autonomous driving control. In this situation, the second pointer-constituents P21, P22, and P23 are superimposed on the foreground landscape F so that the second pointer-constituents P21, P22, and P23 are aligned along the second path RT2 at distance intervals according to the vehicle speed of the vehicle V, and are displayed in the main-display-manner. For example, intervals between the second pointer-constituents P21, P22, and P23 become substantially constant distance intervals when the vehicle speed of the vehicle V is substantially constant.

FIG. 6 illustrates a situation in which intervention of the decelerating manipulation is recognized by the intervening driving manipulation recognition unit 12 during the autonomous driving control. In this situation, the first pointer-constituents P11, P12, and P13 and the second pointer-constituents P21, P22, and P23 are superimposed on the foreground landscape F and displayed on the display device 31. Specifically, the first pointer-constituents P11, P12, and P13 are displayed in the main-display-manner at intervals between the first pointer-constituents P11, P12, and P13 according to an amount of the decelerating manipulation (a manipulation-amount of the decelerating manipulation) of the driver or a deceleration of the vehicle V along the first path RT1. As a result, the intervals between the first pointer-constituents P11, P12, and P13 are displayed to be gradually shorter in this order. Further, the second pointer-constituents P21, P22, and P23 are displayed in the sub-display-manner at intervals between the second pointer-constituents P21, P22, and P23 according to the deceleration of the vehicle V set according to the speed plan of the autonomous driving control along the second path RT2. As a result, the intervals between the second pointer-constituents P21, P22, and P23 are displayed to be gradually shorter in this order. The interval between the first pointer-constituents P11 and P12 is shorter than the intervals between the second pointer-constituents P21 and P22. The interval between the first pointer-constituents P12 and P13 is shorter than the interval between the second pointer-constituents P22 and P23.

Subsequently, a display example when the display device 31 in the situation illustrated in FIGS. 5 and 6 is an MID as illustrated in FIGS. 7A and 7B will be described.

First, FIG. 7A illustrates a situation in which intervention of the decelerating manipulation is not recognized by the intervening driving manipulation recognition unit 12 during the autonomous driving control. In this situation, the second pointer-constituents P21, P22, and P23 are displayed in the main-display-manner so that the second pointer-constituents P21, P22, and P23 are aligned along the second path RT2 at distance intervals according to the vehicle speed of the vehicle V. For example, intervals between the second pointer-constituents P21, P22, and P23 become substantially constant distance intervals when the vehicle speed of the vehicle V is substantially constant.

FIG. 7B illustrates a situation in which intervention of the decelerating manipulation is recognized by the intervening driving manipulation recognition unit 12 during the autonomous driving control. In this situation, the first pointer-constituents P11, P12, and P13 and the second pointer-constituents P21, P22, and P23 are displayed on the display device 31. Specifically, the first pointer-constituents P11, P12, and P13 are displayed in the main-display-manner at intervals between the first pointer-constituents P11, P12, and P13 according to the manipulation-amount of the decelerating manipulation of the driver or a deceleration of the vehicle V along the first path RT1. As a result, the intervals between the first pointer-constituents P11, P12, and P13 are displayed to be gradually shorter in this order. Further, the second pointer-constituents P21, P22, and P23 are displayed in the sub-display-manner at intervals between the second pointer-constituents P21, P22, and P23 according to the deceleration of the vehicle V set according to the speed plan of the autonomous driving control along the second path RT2. As a result, the intervals between the second pointer-constituents P21, P22, and P23 are displayed to be gradually shorter in this order. The interval between the first pointer-constituents P11 and P12 is shorter than the intervals between the second pointer-constituents P21 and P22. The interval between the first pointer-constituents P12 and P13 is shorter than the interval between the second pointer-constituents P22 and P23.

Thus, the display control unit 16A determines whether or not the driving manipulation is a decelerating manipulation when the intervention in the driving manipulation during the autonomous driving control is recognized based on the recognition result of the intervening driving manipulation recognition unit 12. When the driving manipulation of the driver is a decelerating manipulation, the display control unit 16A cause the display device 31 to display the plurality of first pointer-constituents P11, P12, and P13 so that the interval between the first pointer-constituents P11, P12, and P13 becomes short according to the manipulation-amount of the decelerating manipulation or the deceleration of the vehicle V. The display control unit 16A causes the first pointer-constituents P11 and P12 and the second pointer-constituents P21 and P22 to be displayed on the display device 31 so that the interval between the first constituents P11 and P12 becomes shorter than the interval between the second pointer-constituents P21 and P22 when the intervention of the decelerating manipulation by the driver to decelerate the vehicle V at a deceleration greater than a deceleration for deceleration through the autonomous driving control during the autonomous driving control is recognized by the intervening driving manipulation recognition unit 12 in a case where the trajectory is a trajectory in which the vehicle V traveling in the travel lane R1 decelerates through the autonomous driving control. The display control unit 16A causes the first pointer-constituents P12 and P13 and the second pointer-constituents P22 and P23 to be displayed on the display device 31 so that the interval between the first pointer-constituents P12 and P13 becomes shorter than the interval between the second pointer-constituent P22 and P23 when the intervention of the decelerating manipulation by the driver to decelerate the vehicle V at a deceleration greater than a deceleration for deceleration through the autonomous driving control during the autonomous driving control is recognized by the intervening driving manipulation recognition unit 12 in a case where the trajectory is a trajectory in which the vehicle V traveling in the travel lane R1 decelerates through the autonomous driving control.

Figure 8:
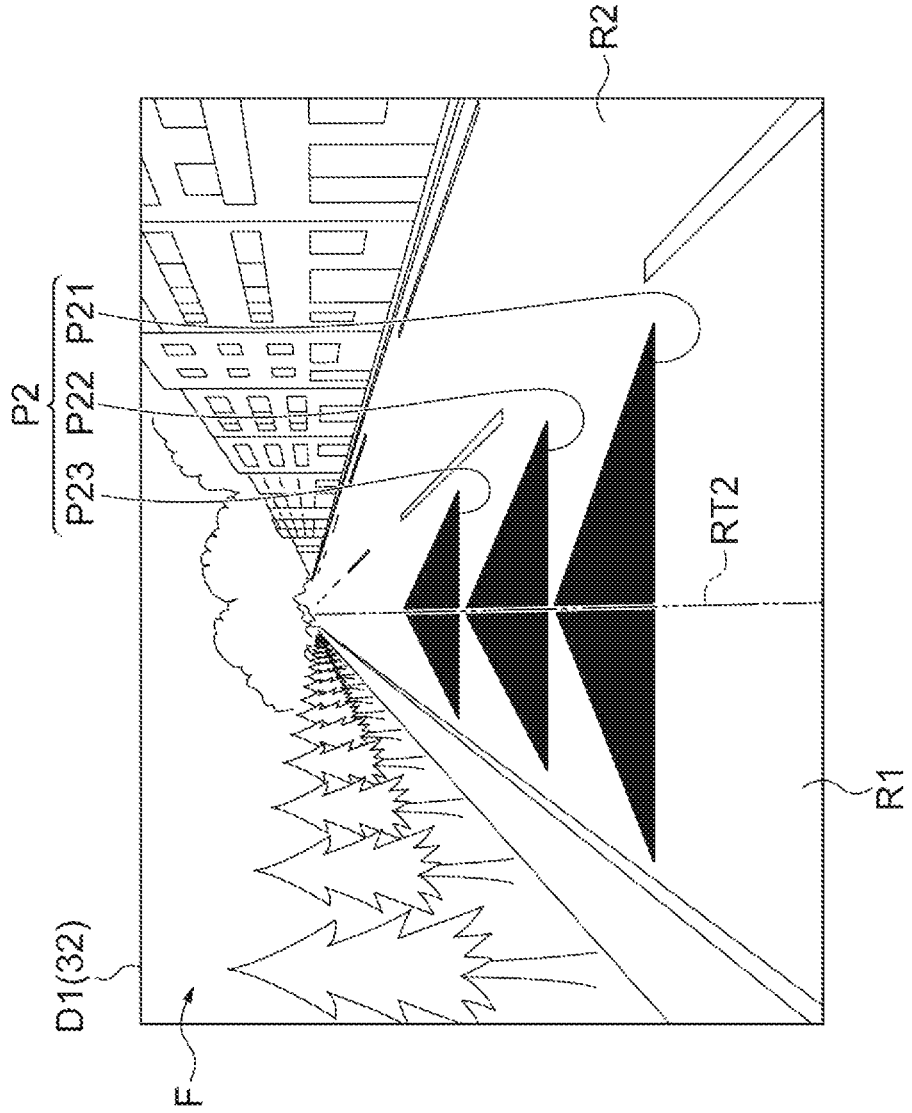
FIG. 8 illustrates another example of a display on an AR-HUD in the display device of FIG. 1 during autonomous driving control.
Figure 9:
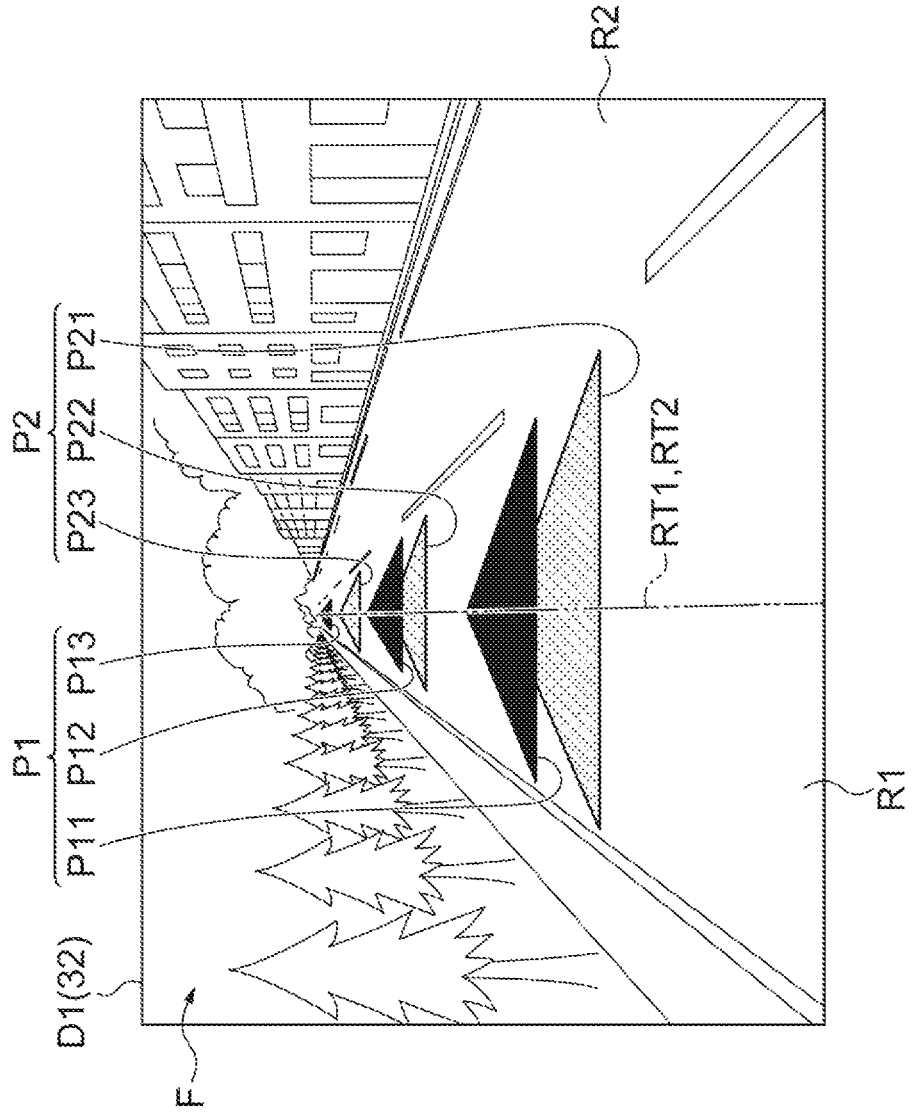
FIG. 9 is a display example showing a situation in which intervention in a driving manipulation is performed following the display example in FIG. 8.
Figures 10A, 10B:
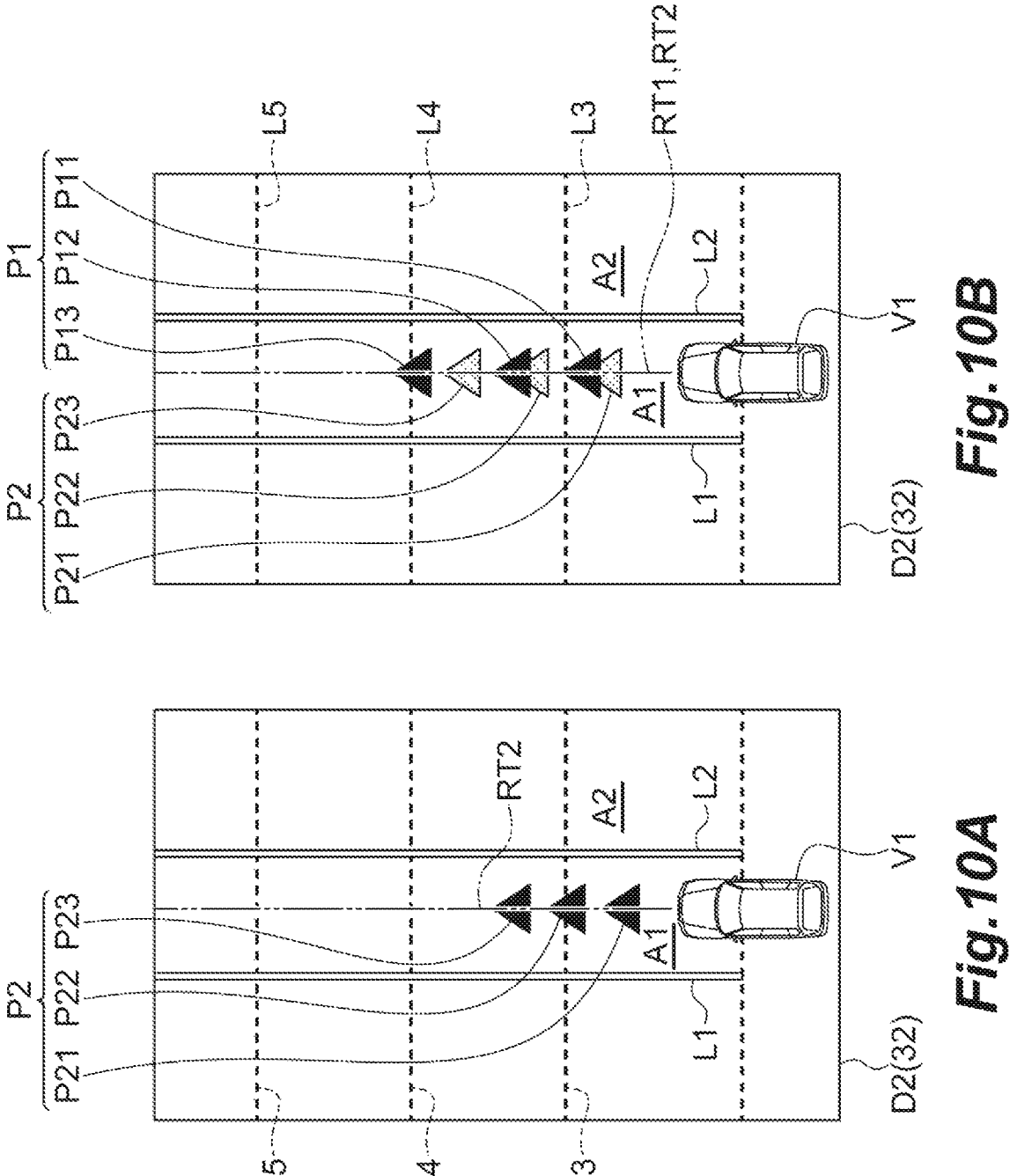
FIG. 10A illustrates another example of a display on an MID in the display device of FIG. 1 during autonomous driving control.
FIG. 10B is a display example showing a situation in which intervention in a driving manipulation is performed following the display example of FIG. 10A.

Next, FIG. 8 illustrates another example of a display on the AR-HUD in the display device 1A during autonomous driving control. FIG. 9 is a display example showing a situation in which intervention in a driving manipulation has been performed following the display example in FIG. 8. FIG. 10A illustrates another example of a display on the MID in the display device 1A during the autonomous driving control. FIG. 10B is a display example showing a situation in which intervention in a driving manipulation has been performed following the display example of FIG. 10A.

A situation in which the driver intervenes in an accelerating manipulation so that the vehicle V accelerates at an acceleration higher than a certain acceleration, for example, when the trajectory is a trajectory in which the vehicle V traveling on the travel lane R1 at the substantially constant vehicle speed through the autonomous driving control accelerates at the certain acceleration will be described herein.

For example, FIG. 8 illustrates a situation in which intervention of the accelerating manipulation is not recognized by the intervening driving manipulation recognition unit 12 during the autonomous driving control. In this situation, the second pointer-constituents P21, P22, and P23 are superimposed on the foreground landscape F so that the second pointer-constituents P21, P22, and P23 are aligned along the second path RT2 at distance intervals according to the vehicle speed of the vehicle V, and are displayed in the main-display-manner. For example, intervals between the second pointer-constituents P21, P22, and P23 become substantially constant distance intervals when the vehicle speed of the vehicle V is substantially constant.

FIG. 9 illustrates a situation in which the intervention of the accelerating manipulation is recognized by the intervening driving manipulation recognition unit 12 during the autonomous driving control. In this situation, the first pointer-constituents P11, P12, and P13 and the second pointer-constituents P21, P22, and P23 are superimposed on the foreground landscape F and displayed on the display device 31. Specifically, the first pointer-constituents P11, P12, and P13 are displayed in the main-display-manner at intervals between the first pointer-constituents P11, P12, and P13 according to an amount of the accelerating manipulation (a manipulation-amount of the accelerating manipulation) of the driver or an acceleration of the vehicle V along the first path RT1. As a result, the intervals between the first pointer-constituents P11, P12, and P13 are displayed to be gradually longer in this order. Further, the second pointer-constituents P21, P22, and P23 are displayed in the sub-display-manner at intervals between the second pointer-constituents P21, P22, and P23 according to the acceleration of the vehicle V set according to the speed plan of the autonomous driving control along the second path RT2. As a result, the intervals between the second pointer-constituents P21, P22, and P23 are displayed to be gradually longer in this order. The interval between the first pointer-constituents P11 and P12 is longer than the intervals between the second pointer-constituents P21 and P22. The interval between the first pointer-constituents P12 and P13 is longer than the interval between the second pointer-constituents P22 and P23.

Subsequently, a display example when the display device 31 in the situation illustrated in FIGS. 8 and 9 is an MID as illustrated in FIGS. 10A and 10B will be described.

First, FIG. 10A illustrates a situation in which intervention of the accelerating manipulation is not recognized by the intervening driving manipulation recognition unit 12 during the autonomous driving control. In this situation, the second pointer-constituents P21, P22, and P23 are displayed in the main-display-manner so that the second pointer-constituents P21, P22, and P23 are aligned along the second path RT2 at distance intervals according to the vehicle speed of the vehicle V. For example, intervals between the second pointer-constituents P21, P22, and P23 become substantially constant distance intervals when the vehicle speed of the vehicle V is substantially constant.

FIG. 10B illustrates a situation in which the intervention of the accelerating manipulation is recognized by the intervening driving manipulation recognition unit 12 during the autonomous driving control. In this situation, the first pointer-constituents P11, P12, and P13 and the second pointer-constituents P21, P22, and P23 are displayed on the display device 31. Specifically, the first pointer-constituents P11, P12, and P13 are displayed in the main-display-manner at intervals between the first pointer-constituents P11, P12, and P13 according to the manipulation-amount of the accelerating manipulation of the driver or an acceleration of the vehicle V along the first path RT1. As a result, the intervals between the first pointer-constituents P11, P12, and P13 are displayed to be gradually longer in this order. Further, the second pointer-constituents P21, P22, and P23 are displayed in the sub-display-manner at intervals between the second pointer-constituents P21, P22, and P23 according to the acceleration of the vehicle V set according to the speed plan of the autonomous driving control along the second path RT2. As a result, the intervals between the second pointer-constituents P21, P22, and P23 are displayed to be gradually longer in this order. The interval between the first pointer-constituents P11 and P12 is longer than the intervals between the second pointer-constituents P21 and P22. The interval between the first pointer-constituents P12 and P13 is longer than the interval between the second pointer-constituents P22 and P23.

Thus, the display control unit 16A determines whether or not the driving manipulation is an accelerating manipulation when the intervention in the driving manipulation during the autonomous driving control is recognized based on the recognition result of the intervening driving manipulation recognition unit 12. When the driving manipulation of the driver is the accelerating manipulation, the display control unit 16A cause the display device 31 to display the plurality of first pointer-constituents P11, P12, and P13 so that the interval between the first pointer-constituents P11, P12, and P13 becomes long according to the manipulation-amount of the accelerating manipulation or the acceleration of the vehicle V. The display control unit 16A causes the first pointer-constituents P11 and P12 and the second pointer-constituents P21 and P22 to be displayed on the display device 31 so that the interval between the first constituents P11 and P12 becomes longer than the interval between the second pointer-constituents P21 and P22 when the intervention of the accelerating manipulation by the driver to accelerate the vehicle V at an acceleration greater than an acceleration for acceleration through the autonomous driving control during the autonomous driving control is recognized by the intervening driving manipulation recognition unit 12 in a case where the trajectory is a trajectory in which the vehicle V traveling in the travel lane R1 accelerates through the autonomous driving control. The display control unit 16A causes the first pointer-constituents P12 and P13 and the second pointer-constituents P22 and P23 to be displayed on the display device 31 so that the interval between the first pointer-constituents P12 and P13 becomes longer than the interval between the second pointer-constituent P22 and P23 when the intervention of the accelerating manipulation by the driver to accelerate the vehicle V at an acceleration greater than an acceleration for acceleration through the autonomous driving control during the autonomous driving control is recognized by the intervening driving manipulation recognition unit 12 in a case where the trajectory is a trajectory in which the vehicle V traveling in the travel lane R1 accelerates through the autonomous driving control.

[Display Control Process of Display Device 1A]

Figure 11:
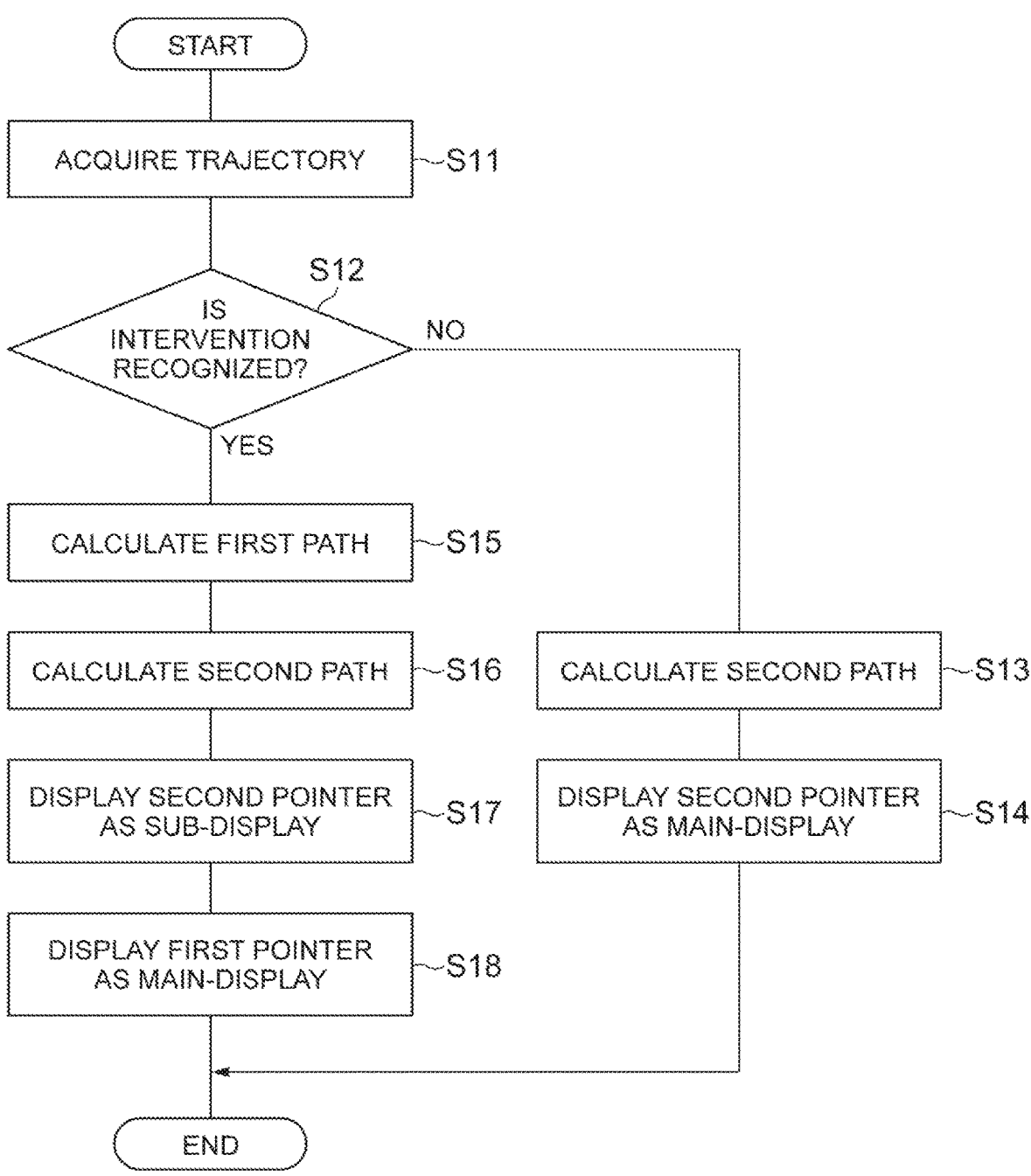
FIG. 11 is a flowchart illustrating a process of the display device of FIG. 1.

Hereinafter, display control of the display device 1A corresponding to the display example of FIGS. 2 to 4B described above will be described. FIG. 11 is a flowchart illustrating a display control process of the display device 1A. The display control process illustrated in FIG. 11 is executed when the autonomous driving control of the autonomous driving system 2 is started, and is stopped when the autonomous driving control is ended. The ECU 10A of the display device 1A performs recognition of the traveling state using the traveling state recognition unit 11 during the autonomous driving control. The traveling state recognition unit 11 recognizes the traveling state of the vehicle V based on the detection result of the internal sensor 23.

As illustrated in FIG. 11, the ECU 10A acquires the trajectory by the trajectory acquisition unit 13 in S11. The trajectory acquisition unit 13 acquires the trajectory (the steering plan and the vehicle speed plan) of autonomous driving control from the autonomous driving system 2.

In S12, the ECU 10A determines whether or not intervention in the driving manipulation is recognized, using the display control unit 16A. The display control unit 16A determines whether or not the intervention in the driving manipulation during the autonomous driving control is recognized based on the recognition result of the intervention in the driving manipulation in the intervening driving manipulation recognition unit 12.

When the display control unit 16A determines that the intervention in the driving manipulation during the autonomous driving control is not recognized in S12 (S12: NO), the ECU 10A performs calculation of the second path RT2 using the second calculation unit 15 in S13. The second calculation unit 15 calculates the second path RT2, which is a path of the vehicle V according to the autonomous driving control, based on the trajectory. In S14, the ECU 10A performs a display of the second pointer using the display control unit 16A. The display control unit 16A causes the second pointer to be displayed as a main-display on the display device 31. Thereafter, the ECU 10A ends the process of FIG. 11.

When the display control unit 16A determines that the intervention in the driving manipulation during the autonomous driving control is recognized in S12 (S12: YES), the ECU 10A performs calculation of the first path RT1 using the first calculation unit 14 in 815. The first calculation unit 14 calculates the first path RT1 which is a path of the vehicle V in a case where the amount of intervention in the driving manipulation is maintained based on the traveling state of the vehicle V and the driving manipulation of the driver. In S16, the ECU 10A performs calculation of the second path RT2 using the second calculation unit 15. The second calculation unit 15 calculates the second path RT2 which is the path of the vehicle V through the autonomous driving control, based on the trajectory.

In S17, the ECU 10A performs a display of the second pointer P2 using the display control unit 16A. The display control unit 16A causes the second pointer P2 to be displayed as a sub-display on the display device 31. In S18, the ECU 10A performs a display of the first pointer P1 using the display control unit 16A. The display control unit 16A causes the first pointer P1 to be displayed as a main-display on the display device 31. Thereafter, the ECU 10A ends the process of FIG. 11.

Figure 12:
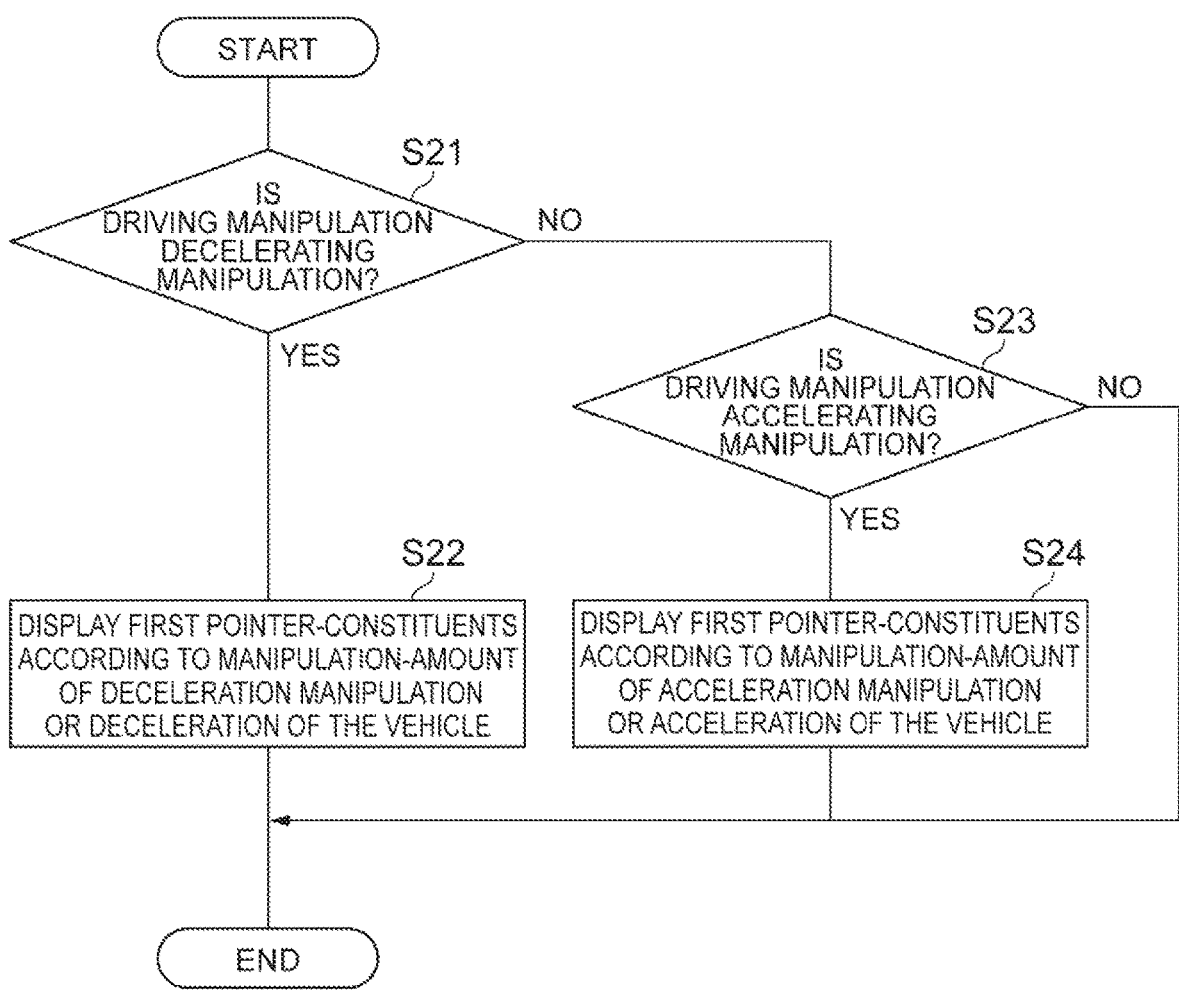
FIG. 12 is a flowchart illustrating a process of the display device of FIG. 1.

Next, display control of the display device 1A corresponding to the display example of FIGS. 5 to 10B described above will be described. FIG. 12 is a flowchart illustrating a display control process of the display device 1A. The display control process illustrated in FIG. 12 is executed when the display control unit 16A determines that the intervention in the driving manipulation during the autonomous driving control is recognized during the autonomous driving control of the autonomous driving system 2, and is stopped when the interruption of the driving manipulation has ended.

As illustrated in FIG. 12, the ECU 10A determines whether or not the driving manipulation is a decelerating manipulation using the display control unit 16A in S21. The display control unit 16A determines whether or not the driving manipulation intervened during the autonomous driving control is a decelerating manipulation based on a recognition result of the intervening driving manipulation recognition unit 12.

When the display control unit 16A determines that the driving manipulation intervened during the autonomous driving control is a decelerating manipulation in S21 (S21: YES), the ECU 10A performs a display of the first pointer P1 the display control unit 16A in S22. The display control unit 16A, for example, causes the first pointer-constituents P11, P12, and P13 to be displayed on the display device 31 according to the manipulation-amount of the decelerating manipulation based on the recognition result of the intervening driving manipulation recognition unit 12. The display control unit 16A may cause the display device 31 to display the first pointer-constituents P11, P12, and P13 according to the deceleration of the vehicle V based on the recognition result of the traveling state recognition unit 11. Thereafter, the ECU 10A ends the process of FIG. 12.

On the other hand, when the display control unit 16A determines that the driving manipulation intervened during the autonomous driving control is not the decelerating manipulation in S21 (S21: NO), the ECU 10A determines whether or not the driving manipulation is an accelerating manipulation using the display control unit 16A in S23.

In S23, when the display control unit 16A determines that the driving manipulation intervened during the autonomous driving control is the accelerating manipulation (S23: YES), the ECU 10A performs a display of the first pointer P1 using the display control unit 16A in S24. The display control unit 16A, for example, causes the first pointer-constituents P11, P12, and P13 to be displayed on the display device 31 according to the manipulation-amount of the accelerating manipulation based on a recognition result of the intervening driving manipulation recognition unit 12. The display control unit 16A may cause the display device 31 to display the first pointer-constituents P11, P12, and P13 according to the acceleration of the vehicle V based on the recognition result of the traveling state recognition unit 11. Thereafter, the ECU 10A ends the process of FIG. 12.

Further, when the display control unit 16A determines that the driving manipulation intervened during the autonomous driving control is not the accelerating manipulation in S23 (S23: NO), the ECU 10A ends the process of FIG. 12.
[Working of Display Device 1A]

With the display device 1A according to the first embodiment described above, the display control unit 16A causes not only the second pointer P2 which is an image showing the second path RT2, but also the first pointer P1 which is an image showing the first path RT1 to be displayed on the display device 31, when the intervention in the driving manipulation during the autonomous driving control is recognized by the intervening driving manipulation recognition unit 12. Accordingly, the driver can visually recognize a difference between the first path RT1 and the second path RT2. Therefore, the driver can easily comprehend the difference between the path of the vehicle V due to the intervention in the driving manipulation (the first path RT 1) and the path of the vehicle V due to autonomous driving control (the second path RT2), when the driver intervenes in the driving manipulation during the autonomous driving control.

In the display device 1A, the display device 31 is an AR-HUD. In the display device 1A, the display control unit 16A causes the first pointer P1 and the second pointer P2 to be displayed on the display device 31 and to be superimposed on the foreground landscape F indicating a situation in front of the vehicle V when the intervention in the driving manipulation during the autonomous driving control is recognized by the intervening driving manipulation recognition unit 12. Thus, since the first pointer P1 and the second pointer P2 are superimposed on the foreground landscape F, the first path RT1 and the second path RT2 are displayed as a path on the road in front of the vehicle V. Thus, the driver can intuitively comprehend the difference between the first path RT1 and the second path RT2 more easily.

In the display device 1A, the first pointer P1 is displayed as a plurality of first pointer-constituents P11, P12, and P13 respectively corresponding to predicted positions on the first path RT1 of the vehicle V at a plurality of future times at predetermined time intervals. The second pointer P2 is displayed as a plurality of second pointer-constituents P21, P22, and P23 respectively corresponding to predicted positions on the second path RT2 of the vehicle V at a plurality of future times. Accordingly, the driver can easily and intuitively comprehend a transition of the predicted position of the vehicle V according to the speed of the vehicle V as a positional relationship between the first pointer-constituents P11, P12, and P13 on the display device 31.

In the display device 1A, the display control unit 16A causes the second pointer P2 to be displayed as a main-display on the display device 31 during autonomous driving control, and causes the first pointer P1 to be displayed as a main-display on the display device 31 and causes the second pointer P2 to be displayed as a sub-display on the display device 31 when the intervention in the driving manipulation during autonomous driving control is recognized by the intervening driving manipulation recognition unit 12. Accordingly, the first pointer P1 is displayed on the display device 31 as the main-display, when the intervention in the driving manipulation during the autonomous driving control is recognized by the intervening driving manipulation recognition unit 12. Therefore, the first pointer P1 is more conspicuous than the second pointer P2. As a result, the driver can easily and intuitively comprehend that the vehicle V travels along the first path RT1 according to the intervention in the driving manipulation.

In the display device 1A, the plurality of first pointer-constituents P11, P12, and P13 are displayed so that the intervals between first pointer-constituents P11, P12, and P13 are shorter according to the manipulation-amount of the decelerating manipulation or the deceleration of the vehicle V, when the driving manipulation of the driver is the decelerating manipulation. The plurality of first pointer-constituents P11, P12, and P13 are displayed so that the intervals between first pointer-constituents P11, P12, and P13 are longer according to the manipulation-amount of the accelerating manipulation or the acceleration of the vehicle V when the driving manipulation of the driver is the accelerating manipulation. Thus, the driver can intuitively comprehend a change in the speed of the vehicle V according to the driving manipulation as the intervals between the first pointer-constituents P11, P12, and P13 along the first path RT1.

The plurality of first pointer-constituents P11, P12, and P13 do not necessarily correspond to predicted positions on the first path RT1 of the vehicle V at a plurality of future times at predetermined time intervals. The plurality of second pointer-constituents P21, P22, and P23 do not necessarily correspond to predicted positions on the second path RT2 of the vehicle V at a plurality of future times. For example, the display control unit 16A may cause the plurality of first pointer-constituents P11, P12, and P13 to be displayed at a preset interval that becomes shorter according to the manipulation-amount of the decelerating manipulation or the deceleration of the vehicle V, when the driving manipulation of the driver is a decelerating manipulation. For example, the display control unit 16A may cause the plurality of first pointer-constituents P11, P12, and P13 to be displayed at a preset interval that becomes longer according to the manipulation-amount of the accelerating manipulation or the acceleration of the vehicle V, when the driving manipulation of the driver is an accelerating manipulation. In this case, the driver can intuitively comprehend a change in the speed of the vehicle V according to the driving manipulation as the intervals between the first pointer-constituents P11, P12, and P13 along the first path RT1.

In the display device 1A, the display control unit 16A causes the plurality of first pointer-constituents P11, P12 (P12, P13) and the plurality of second pointer-constituents P21, P22 (P22, P23) to be displayed on the display device 31 so that the interval between the plurality of first pointer-constituents P11, P12 (P12, P13) becomes longer than the interval between the plurality of second pointer-constituents P21, P22 (P22, P23) when the intervention of the accelerating manipulation by the driver to accelerate the vehicle V at an acceleration greater than an acceleration for acceleration through the autonomous driving control during the autonomous driving control is recognized by the intervening driving manipulation recognition unit 12 in a case where the trajectory is a trajectory in which the vehicle V accelerates through the autonomous driving control. The driver can easily comprehend a difference between the acceleration due to the manipulation by the driver and the acceleration due to the autonomous driving control.

In the display device 1A, the display control unit 16A causes the plurality of first pointer-constituents P11, P12

(P12, P13) and the plurality of second pointer-constituents P21, P22 (P22, P23) to be displayed on the display device 31 so that the interval between the plurality of first pointer-constituents P11, P12 (P12, P13) becomes shorter than the interval between the plurality of second pointer-constituents P21, P22 (P22, P23), when the intervention of the decelerating manipulation by the driver to decelerate the vehicle V at a deceleration greater than a deceleration for deceleration through the autonomous driving control during the autonomous driving control is recognized by the intervening driving manipulation recognition unit 12 in a case where the trajectory is a trajectory in which the vehicle V decelerates through the autonomous driving control. The driver can easily comprehend a difference between the deceleration due to the manipulation by the driver and the deceleration due to the autonomous driving control.

Second Embodiment

Figure 13:
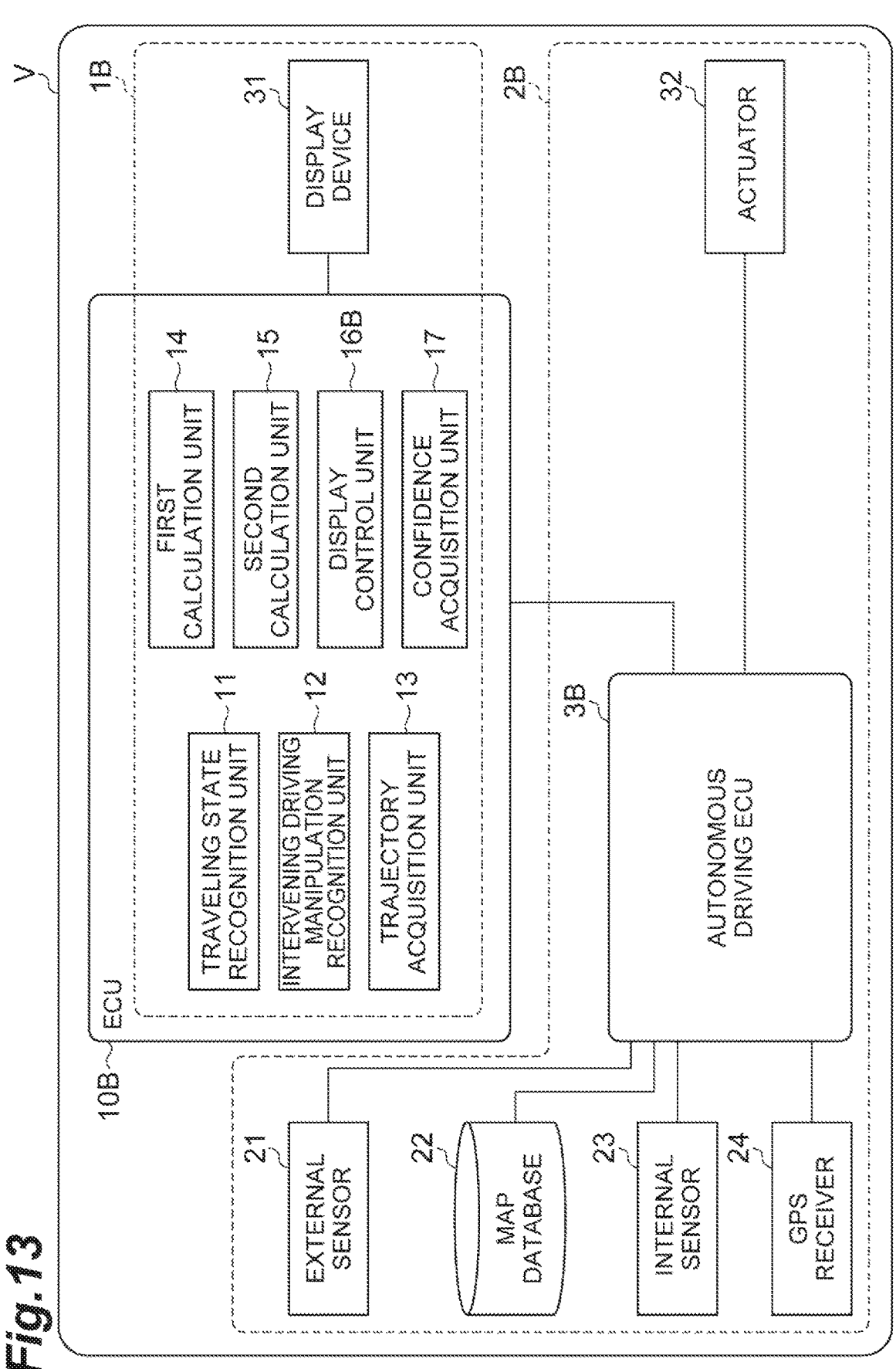
FIG. 13 is a block diagram illustrating a display device and an autonomous driving system according to a second embodiment.

FIG. 13 is a block diagram illustrating a display device 1B and an autonomous driving system 2B according to a second embodiment. As illustrated in FIG. 13, the display device 1B basically configured similarly to the display device 1A, but is different from the display device 1A in that the display device 1B includes the ECU 10B in place of the ECU 10A. Further, the autonomous driving system 2B is basically configured similarly to the autonomous driving system 2, but is different from the autonomous driving system 2 in that the autonomous driving system 2B includes an autonomous driving ECU 3B in place of the autonomous driving ECU 3.

The autonomous driving ECU 3B calculates, for example, a degree of confidence (reliability) of autonomous driving using a well-known scheme based on reliability (accuracy) of map information. The degree of confidence of autonomous driving is an indicator indicating reliability (certainty) of the autonomous driving control. The degree of confidence of the autonomous driving, for example, may be calculated according to a degree of confidence of host-vehicle position estimation (localization) of the vehicle V. The degree of confidence of the autonomous driving may be, for example, a rate at which the vehicle can travel according to the autonomous driving in the past under the same situation (for example, a rate of the number of times autonomous driving is possible with the total number of times of traveling as a population) based on a history in which a vehicle capable of traveling in autonomous driving (which may be a host vehicle or may be another vehicle) has traveled under the same situation (place, time, weather, or the like).

The ECU 10B is basically configured similarly to the ECU 10A, but is different from the ECU 10A in that the ECU 10B includes a display control unit 16B in place of the display control unit 16A and further includes a degree-of-confidence acquisition unit 17.

The degree-of-confidence acquisition unit 17 acquires degree of confidence information on the degree of confidence from the autonomous driving system 2B. When the vehicle V has started the autonomous driving control, the degree-of-confidence acquisition unit 17 acquires the degree of confidence information from the autonomous driving system 2.

The display control unit 16B changes the display manner of the second pointer P2 according to the degree of system confidence. For example, the display control unit 16B may change, for example, color, shape, height of the second pointer-constituents (an apparent height in the case of a 3D display), an interval between the second pointer-constituents, transparency, a degree of blurring, and how to change the display position according to a degree of system confidence, as a mode of changing the display manner of the second pointer P2.

[Display Control Process of Display Device 1B]

Figure 14:
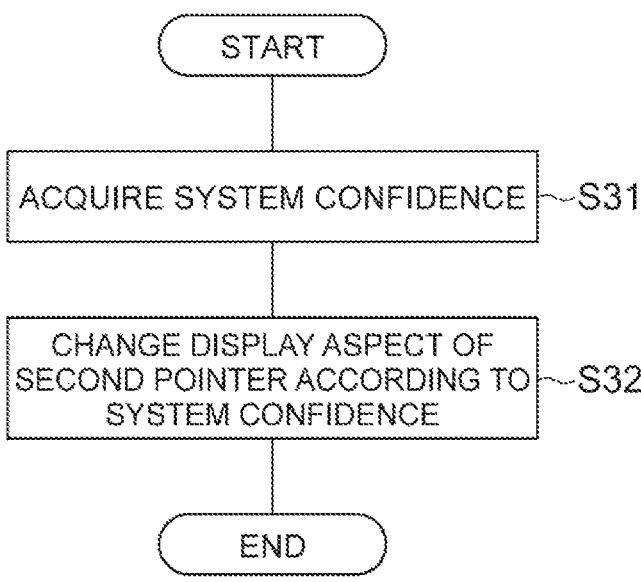
FIG. 14 is a flowchart illustrating a process of the display device of FIG. 13.

Hereinafter, display control of the above-described display device 1B will be described. FIG. 14 is a flowchart illustrating a display control process of the display device 1B. The display control process illustrated in FIG. 14 is executed, for example, when the display control unit 16B determines that the intervention in the driving manipulation during the autonomous driving control is recognized. The display control process illustrated in FIG. 14 may be executed also when the display control unit 16B determines that the intervention in the driving manipulation during the autonomous driving control is not recognized.

As illustrated in FIG. 14, the ECU 10B of the display device 1B performs acquisition of a degree of system confidence using the degree-of-confidence acquisition unit 17 in S31. Specifically, the degree-of-confidence acquisition unit 17 acquires the degree of system confidence from the autonomous driving system 2B.

In S32, the ECU 10B performs changing of the display manner of the second pointer using the display control unit 16B. The display control unit 16B changes the display manner of the second pointer according to the degree of system confidence acquired from the autonomous driving system 2B. Thereafter, the ECU 10B ends the process of FIG. 11.

[Working of Display Device 1B]

As described above, the display device 1B according to the second embodiment further includes the degree-of-confidence acquisition unit 17 that acquires a degree of system confidence of the autonomous driving control from the autonomous driving system 2. According to the display device 1B, the display control unit 16B changes the display manner of the second pointer P2 according to the degree of system confidence. Thus, the driver can easily comprehend the certainty of the second path RT2 according to the display manner of the second pointer P2.

Third Embodiment

Figure 15:
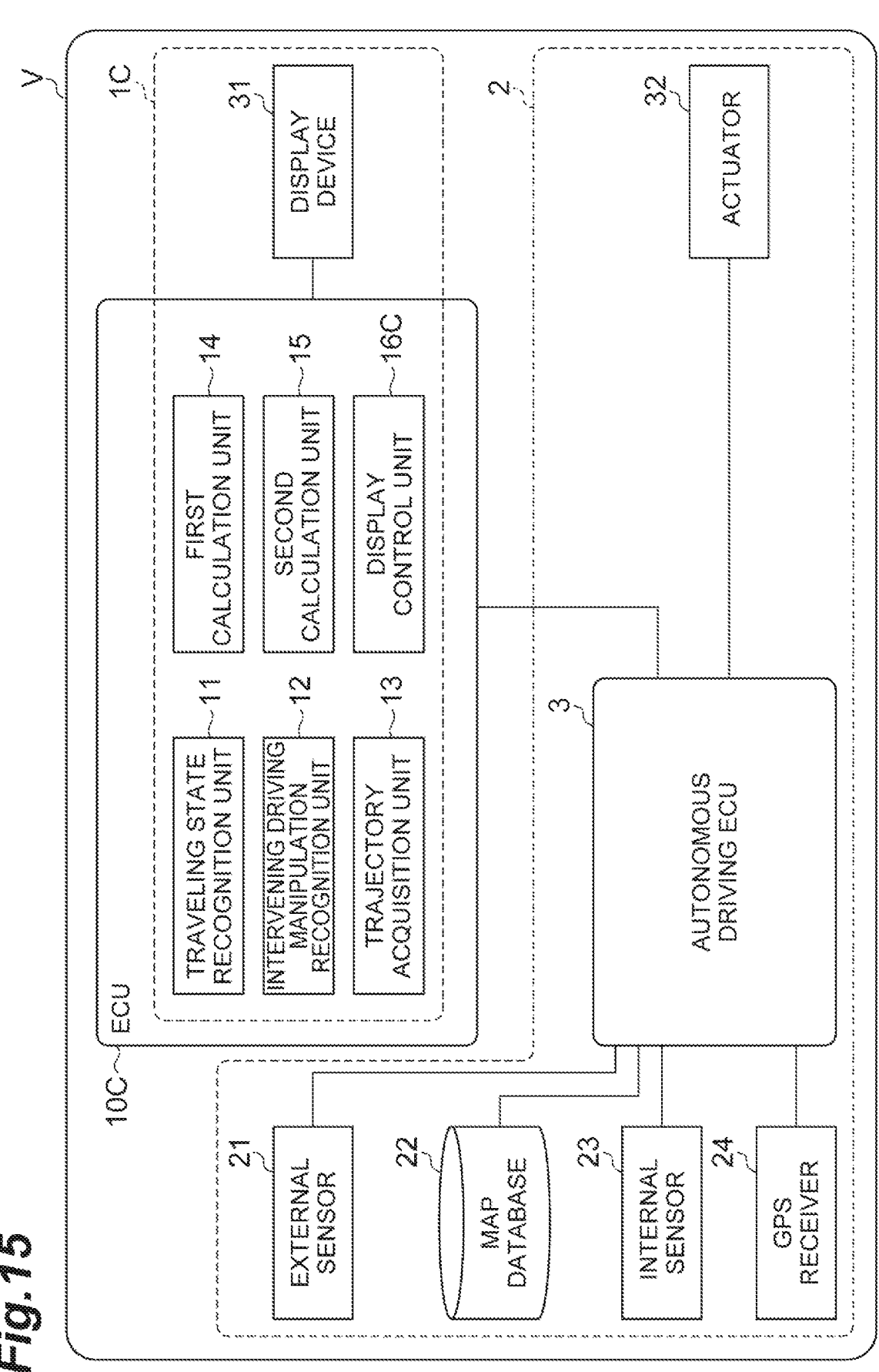
FIG. 15 is a block diagram illustrating a display device and an autonomous driving system according to a third embodiment.

FIG. 15 is a block diagram illustrating a display device 1C and an autonomous driving system 2 according to a third embodiment. As illustrated in FIG. 15, the display device 1C basically configured similarly to the display device 1A, but is different from the display device 1A in that the display device 1C includes an ECU 10C in place of the ECU 10A. The ECU 10C basically configured similarly to the ECU 10A, but is different from the ECU 10A in that the ECU 10C includes a display control unit 16C in place of the display control unit 16A.

The display control unit 16C determines whether or not the driving manipulation is a decelerating manipulation when the intervention in the driving manipulation during the autonomous driving control is recognized based on the recognition result of the intervening driving manipulation recognition unit 12. The display control unit 16C causes a first predicted stop pointer P14 indicating a first predicted stop position to be displayed on the display device 31, when the driving manipulation of the driver is a decelerating manipulation. The first predicted stop position is a predicted stop position of the vehicle V if the manipulation-amount of the decelerating manipulation is maintained.

The first predicted stop position is a position on the map of the vehicle V in a traveling direction of the vehicle V at which the vehicle V is predicted to stop as the vehicle V decelerates at a deceleration according to the decelerating manipulation when the manipulation-amount of the decelerating manipulation is maintained. The first predicted stop pointer P14 is an image showing the position on the display device 31 corresponding to the first predicted stop position. The first predicted stop pointer P14 may be, for example, an image different from the first pointer-constituents P11, P12, and P13. A shape of the first predicted stop pointer P14 may be, for example, circular.

Further, the display control unit 16C determines whether or not the vehicle V will be stopped through autonomous driving control. The display control unit 16C causes a second predicted stop pointer P24 indicating the second predicted stop position which is the predicted stop position of the vehicle V due to the autonomous driving control to be displayed on the display device 31, when the vehicle V will be stopped through the autonomous driving control.

The second predicted stop position is a position on the map of the vehicle V in a traveling direction of the vehicle V at which the vehicle V is predicted to stop as the vehicle V decelerates at a deceleration according to the decelerating manipulation when the trajectory of the autonomous driving control includes a vehicle speed plan in which the vehicle V is decelerated. The second predicted stop pointer P24 is an image showing the position on the display device 31 corresponding to the second predicted stop position. The second predicted stop pointer P24 may be, for example, an image different from the second pointer-constituents P21, P22, and P23. A shape of the second predicted stop pointer P24 may be, for example, circular.

Further, when a predetermined time has elapsed since the intervention in the driving manipulation has been recognized while the intervention in the driving manipulation during the autonomous driving control is recognized by the intervening driving manipulation recognition unit 12, the display control unit 16C causes the first pointer P1 and the second pointer P2 to be displayed on the display device 31 so that an emphasis-degree of the second pointer P2 becomes weaker than before the predetermined time has elapsed since the intervention in the driving manipulation has been recognized. The predetermined time is a preset period from the recognition of the intervention in the driving manipulation to the change in the emphasis-degree of the second pointer P2. The predetermined time is not particularly limited, but can be, for example, a time within 3 seconds. The predetermined time can be, for example, a short time such as 0.5 second, 0.1 second, or a time corresponding to one cycle of a calculation cycle of the ECU 10C.

"Reducing the emphasis-degree of the second pointer P2" includes changing the display manner of the second pointer P2 so that stimulus to driver's vision is suppressed according to the elapsed time since the intervention in the driving manipulation has been recognized. For example, it is possible to weaken the emphasis-degree of the second pointer P2 by changing color, shape, and height (an apparent height in the case of a 3D display) of the second pointer-constituents, an interval between the second pointer-constituents, transparency, a degree of blurring, and how to change a display position so that the stimulus to driver's vision is suppressed according to the elapsed time since the intervention in the driving manipulation has been recognized.

The display control unit 16C may cause, for example, the display device 31 to display the second pointer P2 in a light gray color. For example, the display control unit 16C may further reduce a color density of the second pointer P2 displayed in the light gray color with the lapse of time (tone down). The display control unit 16C, for example, may erase the second pointer P2 from the display device 31 when a time equal to or longer than a preset threshold value has elapsed.

[Display Example of Display Device 1C]

Figure 16:
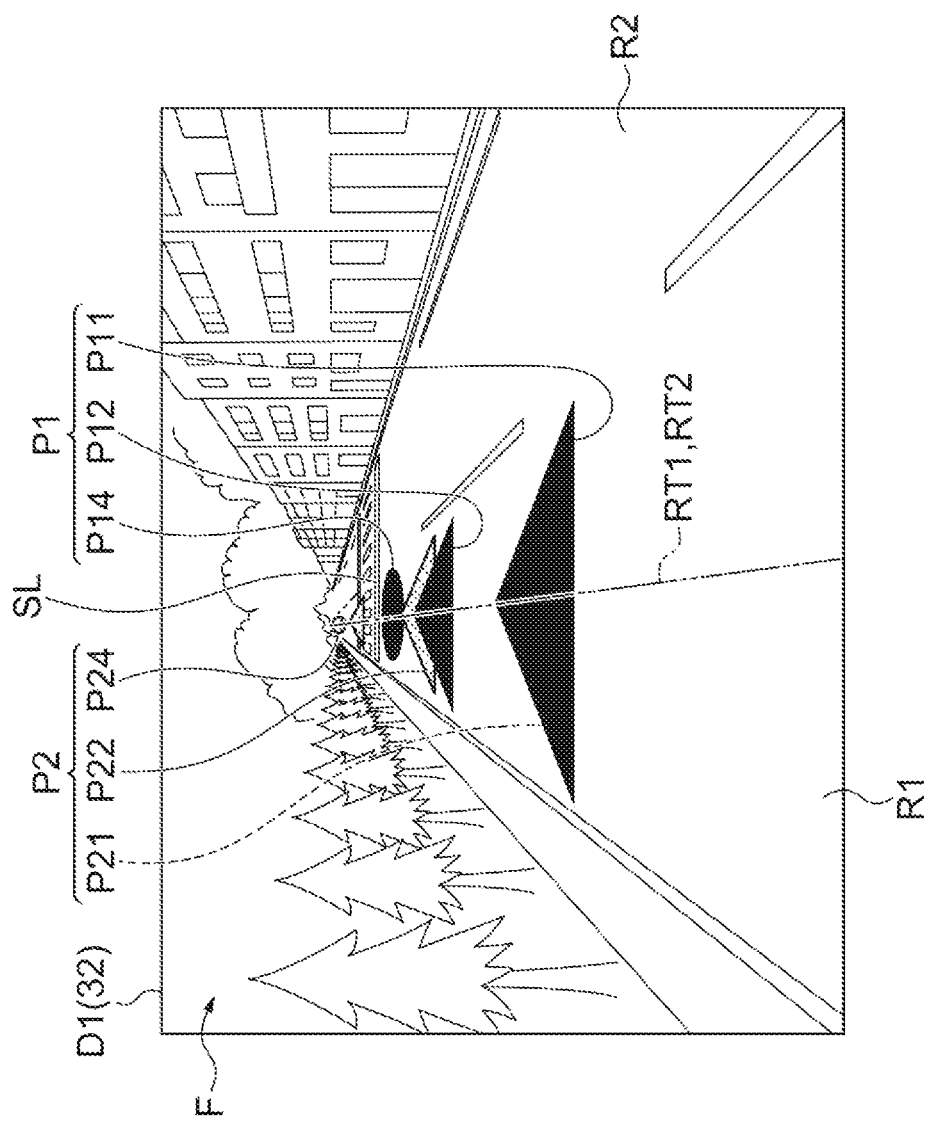
FIG. 16 illustrates an example of a display on an AR-HUD in the display device of FIG. 15 when intervention of a decelerating manipulation of a driver has been performed.
Figure 17:
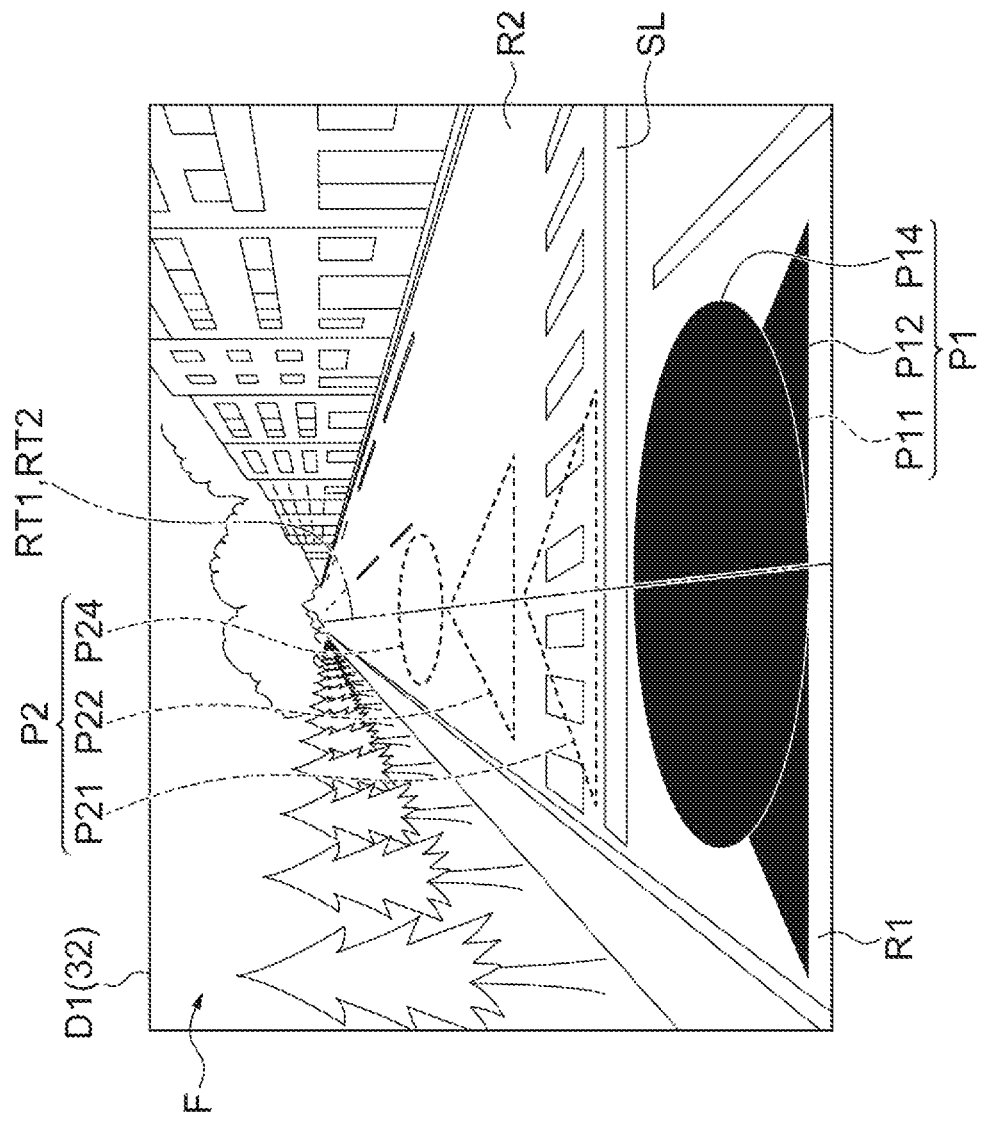
FIG. 17 is a display example showing a situation in which a vehicle has stopped following the display example of FIG. 16.
Figures 18A, 18B:
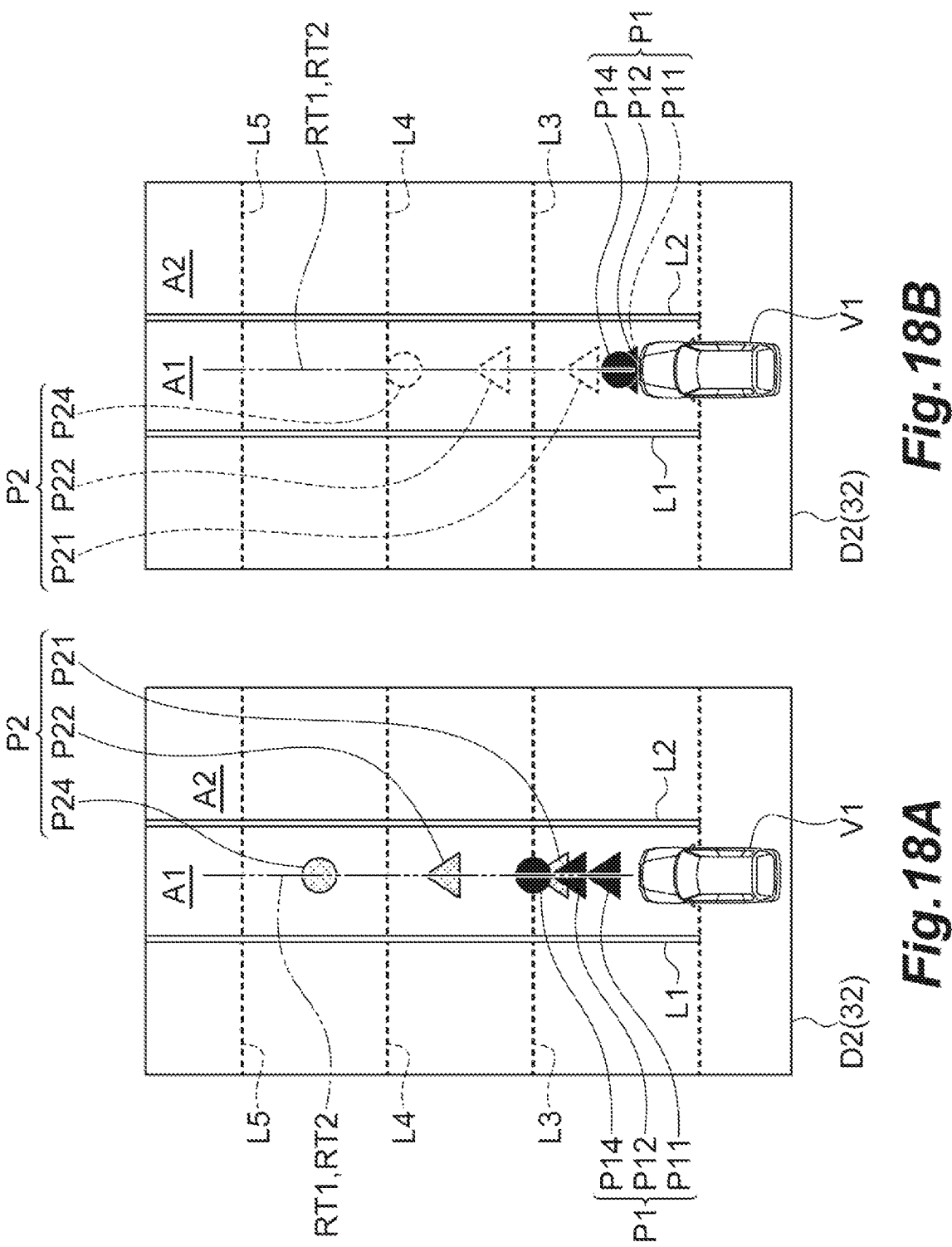
FIG. 18A illustrates an example of a display on the MID in the display device of FIG. 15.
FIG. 18B is a display example showing a situation following the display example of FIG. 18A.

Here, FIG. 16 illustrates an example of a display on the AR-HUD by the display device 1C when intervention of a decelerating manipulation of the driver is performed. FIG. 17 is a display example showing a situation in which the vehicle has stopped following the display example of FIG. 16. FIG. 18A illustrates an example of a display on the MID by the display device 1C. FIG. 18B is a display example showing a situation following the display example of FIG. 18A.

Here, as an example, a situation in which the driver intervenes the decelerating manipulation to stop the vehicle V on the far side of the stop line SL in front of the vehicle V by decelerating the vehicle V at a deceleration larger than a certain deceleration when the trajectory is a trajectory in which the vehicle V is stopped on on the near side of the stop line SL in front of the vehicle V by decelerating the vehicle V traveling in the travel lane R1 through the autonomous driving control at the certain deceleration will be described.

For example, FIG. 16 illustrates a situation in which intervention of the decelerating manipulation is recognized by the intervening driving manipulation recognition unit 12 during the autonomous driving control. In this situation, the first pointer-constituents P11 and P12 and the first predicted stop pointer P14, and the second pointer-constituents P21 and P22 and the second predicted stop pointer P24 are superimposed on the foreground landscape F and are displayed on the display device 31.

Specifically, the first pointer-constituents P11 and P12 and the first predicted stop pointer P14 are displayed in the main-display-manner at intervals between the first pointer-constituents P11 and P12 and the first predicted stop pointers P14 according to the manipulation-amount of the decelerating manipulation by the driver or the deceleration of the vehicle V along the first path RT1. As a result, the intervals between the first pointer-constituents P11 and P12 and the first predicted stop pointers P14 are displayed to be gradually shorter in this order. Further, the first predicted stop pointer P14 is displayed at a position on the display device 31 corresponding to the first predicted stop position located on the near side of the stop line SL in front of the vehicle V.

Further, the second pointer-constituents P21 and P22 and the second predicted stop pointer P24 are displayed in the sub-display-manner at intervals between the second pointer-constituents P21 and P22 and the second predicted stop pointer P24 according to the deceleration of the vehicle V set according to the speed plan of autonomous driving control along the second path RT2. As a result, the intervals between the second pointer-constituents P21 and P22 and the second predicted stop pointers P24 are displayed to gradually become shorter in this order. Further, the second predicted stop pointer P24 is displayed at a position on the display device 31 corresponding to the second predicted stop position located on the far side of the stop line SL in front of the vehicle V.

FIG. 17 illustrates a situation in which the vehicle V has actually stopped on the near side of the stop line SL as a result of the intervention of the decelerating manipulation illustrated in FIG. 16. In this situation, for example, the first pointer-constituents P11 and P12 and the first predicted stop pointer P14 are displayed at the position on the display device 31 corresponding to the first predicted stop position so that the first pointer-constituents P11 and P12 and the first predicted stop pointer P14 overlap each other.

Further, in FIG. 17, it is assumed that the predetermined time has elapsed since the intervention of the decelerating manipulation has been recognized. In this situation, the second pointer-constituents P21 and P22 and the second predicted stop pointer P24 are displayed on the display device 31 so that the emphasis-degree becomes weaker than that before the predetermined time elapses since the intervention of the decelerating manipulation has been recognized (the example in FIG. 16). In the example of FIG. 17, contours of the second pointer-constituents P21 and P22 and the second predicted stop pointer P24 are displayed in dashed lines as a display manner in which the emphasis-degree is weakened (the same applies to 18B).

Subsequently, a display example when the display device 31 in the situation illustrated in FIGS. 16 and 17 is an MID as illustrated in FIGS. 18A and 18B will be described.

First, FIG. 18A illustrates a situation in which intervention of the decelerating manipulation is recognized by the intervening driving manipulation recognition unit 12 during the autonomous driving control. In this situation, the first pointer-constituents P11 and P12 and the first predicted stop pointer P14, and the second pointer-constituents P21 and P22 and the second predicted stop pointer P24 are displayed on the display device 31.

FIG. 18B illustrates a situation in which the vehicle V has actually stopped on the near side of the stop line SL as a result of the intervention of the decelerating manipulation illustrated in FIG. 18A. In this situation, for example, the first pointer-constituents P11 and P12 and the first predicted stop pointer P14 are displayed at the position on the display device 31 corresponding to the first predicted stop position so that the first pointer-constituents P11 and P12 and the first predicted stop pointer P14 overlap each other. Further, in FIG. 18B, the second pointer-constituents P21 and P22 and the second predicted stop pointer P24 are displayed on the display device 31 so that the emphasis-degree becomes weaker than that before the predetermined time elapses since the intervention of the decelerating manipulation has been recognized (the example in FIG. 18A).

[Display Control Process of Display Device 1C]

Figure 19:
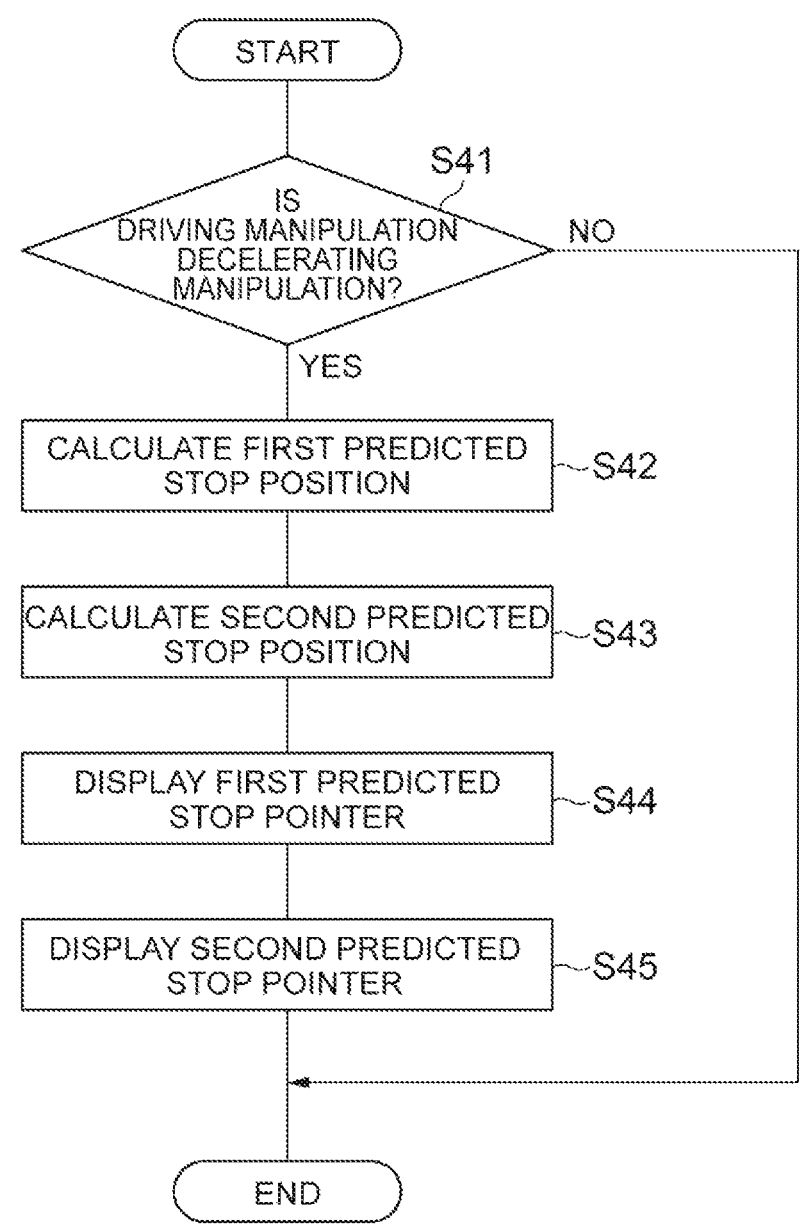
FIG. 19 is a flowchart illustrating the process of the display device of FIG. 15.

Hereinafter, display control of the display device 1C corresponding to the display example in FIGS. 16 to 18B described above will be described. FIG. 19 is a flowchart illustrating a display control process of the display device 1C. The display control process illustrated in FIG. 19 is executed when the display control unit 16C determines that the intervention in the driving manipulation during the autonomous driving control is recognized during the autonomous driving control of the autonomous driving system 2, and is stopped when the interruption of the driving manipulation has ended.

As illustrated in FIG. 19, the ECU 10C of the display device 1C determines whether or not the driving manipulation is a decelerating manipulation using the display control unit 16C in S41. The display control unit 16C determines whether or not the driving manipulation intervened during the autonomous driving control is a decelerating manipulation based on the recognition result of the intervening driving manipulation recognition unit 12. When the display control unit 16C determines that the driving manipulation intervened during the autonomous driving control is not the decelerating manipulation in S41 (S41: NO), the ECU 10C ends the process of FIG. 19.

On the other hand, when the display control unit 16C determines that the driving manipulation intervened during the autonomous driving control is the decelerating manipulation in S41 (S41: YES), the ECU 10C causes the display control unit 16C to perform calculation of the first predicted stop position in S42. The display control unit 16C calculates the first predicted stop position when the manipulation-amount of the decelerating manipulation is maintained based on the recognition results of the traveling state recognition unit 11 and the intervening driving manipulation recognition unit 12.

In S43, the ECU 10C performs calculation of the second predicted stop position using the display control unit 16C. When the vehicle V will be stopped through the autonomous driving control, the display control unit 16C calculates the second predicted stop position of the vehicle V due to the autonomous driving control based on the trajectory. When the vehicle V will not be stopped through the autonomous driving control, the display control unit 16C may omit the calculation of the second predicted stop position.

In S44, the ECU 10C performs a display of the first predicted stop pointer P14 using the display control unit 16C. The display control unit 16C causes the first predicted stop pointer P14 indicating the first predicted stop position to be displayed on the display device 31.

In S45, the ECU 10 performs a display of the second predicted stop pointer P24 using the display control unit 16C. The display control unit 16C causes the second predicted stop pointer P24 indicating the second predicted stop position to be displayed on the display device 31. When the calculation of the second predicted stop position is omitted, the display control unit 16C may omit the display of the second predicted stop pointer P24. Thereafter, the ECU 10C ends the process of FIG. 19.

Figure 20:
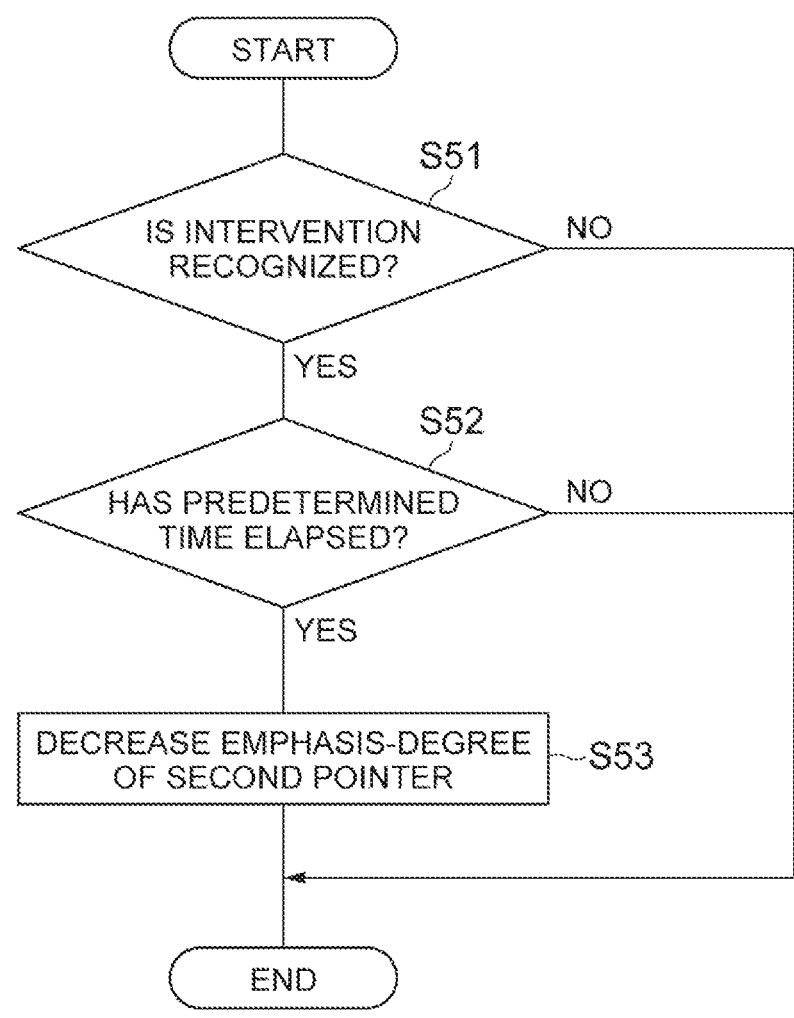
FIG. 20 is a flowchart illustrating a process of the display device of FIG. 15.

Next, display control of the display device 1C corresponding to the display example of FIG. 17 described above will be described. FIG. 20 is a flowchart illustrating the display control process of the display device 1C. The display control process illustrated in FIG. 20 is executed when the display control unit 16C determines that the intervention in the driving manipulation during the autonomous driving control is recognized during the autonomous driving control of the autonomous driving system 2, and is stopped when the interruption of the driving manipulation has ended.

As illustrated in FIG. 20, the ECU 10C determines whether intervention in the driving manipulation is being recognized by the display control unit 16C in S51. The display control unit 16C determines whether or not the intervening driving manipulation recognition unit 12 is recognizing the intervention in the driving manipulation during the autonomous driving control based on a recognition result of the intervening driving manipulation recognition unit 12. In S51, when the display control unit 16C determines that the intervention in the driving manipulation is not being recognized (S51: NO), the ECU 10C ends the process of FIG. 20.

On the other hand, in S51, when the display control unit 16C determines that the intervention in the driving manipulation is being recognized (S51: YES), the ECU 10C determines whether or not a predetermined time has elapsed since the intervention in the driving manipulation has been recognized by the display control unit 16C in S52. The display control unit 16C determines whether or not the predetermined time has elapsed since the intervening driving manipulation recognition unit 12 has recognized the intervention in the driving manipulation during the autonomous driving control based on a recognition result of the intervening driving manipulation recognition unit 12. In S52, when the display control unit 16C determines that the predetermined time has not elapsed from the recognition of the intervention in the driving manipulation (S52: NO), the ECU 10C ends the process of FIG. 20.

On the other hand, when the display control unit 16C has determined that the predetermined time has elapsed since the intervention in the driving manipulation has been recognized in S52 (S52: YES), the ECU 10C decreases the emphasis-degree of the second pointer P2 using the display control unit 16C in S53. The display control unit 16C causes the second pointer P2 to be displayed on the display device 31 so that the emphasis-degree of the second pointer P2 becomes weaker than that before the predetermined time elapses since the intervention in the driving manipulation has been recognized. For example, the display control unit 16C causes the second pointer P2 to be displayed in light gray color on the display device 31. For example, the display control unit 16C may further reduce a color density of the second pointer P2 displayed in the light gray color with the lapse of time (tone down). The display control unit 16C, for example, may erase the second pointer P2 from the display device 31 when a time equal to or longer than a preset threshold value has elapsed. Thereafter, the ECU 10C ends the process of FIG. 20.

[Working of Display Device 1C]

With the display device 1C according to the third embodiment described above, the display control unit 16C causes the first predicted stop pointer P14 indicating the first predicted stop position to be displayed on the display device 31 when the driving manipulation of the driver is the decelerating manipulation. The first predicted stop position that is the predicted stop position of the vehicle V when the manipulation-amount of the decelerating manipulation is maintained. When the vehicle V is stopped through the autonomous driving control, the display control unit 16C causes the second predicted stop pointer P24 indicating the second predicted stop position which is the predicted stop position of the vehicle V due to the autonomous driving control to be displayed on the display device 31. Thus, the driver can easily comprehend the difference between the predicted stop position of the vehicle V due to the driving manipulation and the predicted stop position of the vehicle V due to the autonomous driving control.

According to the display device 1C, when a predetermined time has elapsed since the intervention in the driving manipulation has been recognized while the intervention in the driving manipulation during the autonomous driving control is recognized by the intervening driving manipulation recognition unit 12, the display control unit 16C causes the first pointer P1 and the second pointer P2 to be displayed on the display device 31 so that the emphasis-degree of the second pointer P2 becomes weaker than before the predetermined time has elapsed since the intervention in the driving manipulation has been recognized. Accordingly, the driver can comprehend, for example, that the vehicle V continues to follow intervention in the driving manipulation after the predetermined time has elapsed since the intervention in the driving manipulation has been recognized, while improving driver's awareness of the intervention in the driving manipulation, for example, by the driver comprehending the difference between the first path RT1 and the second path RT2 during a period from the recognition of the intervention in the driving manipulation to the lapse of the predetermined time.

Fourth Embodiment

Figure 21:
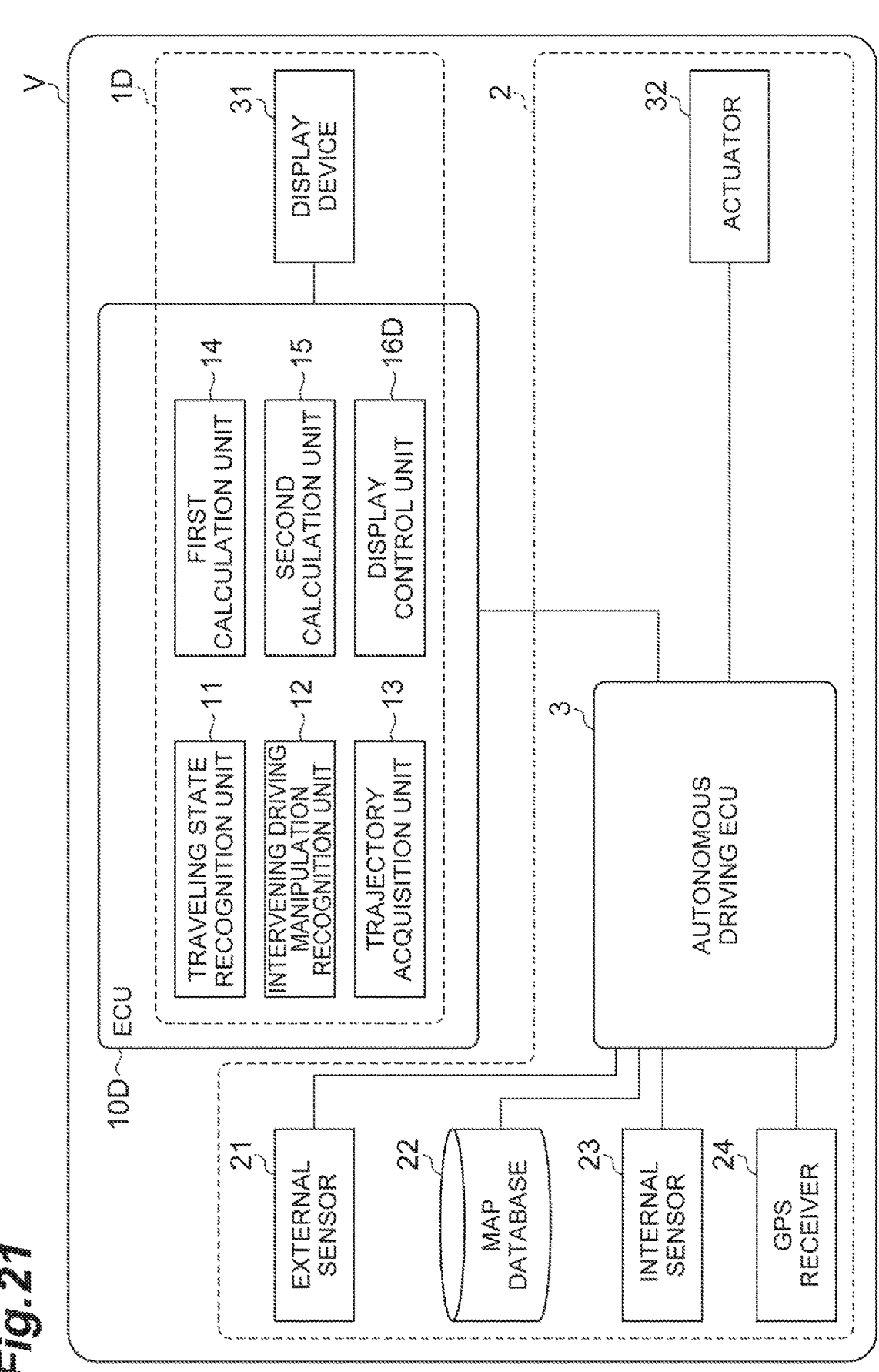
FIG. 21 is a block diagram illustrating a display device and an autonomous driving system according to a fourth embodiment.

FIG. 21 is a block diagram illustrating a display device 1D and an autonomous driving system 2 according to a fourth embodiment. As illustrated in FIG. 21, the display device 1D is basically configured similarly to the display device 1A, but is different from the display device 1A in that the display device 1D includes an ECU 10D in place of the ECU 10A. The ECU 10D is basically configured similarly to the ECU 10A, but is different from the ECU 10A in that the ECU 10D includes a display control unit 16D in place of the display control unit 16A.

The display control unit 16D causes the recommended return pointer P15 to be displayed on the display device 31 based on the first path RT1 and the second path RT2 when the intervening driving manipulation recognition unit 12 has recognized the intervention in the driving manipulation during the autonomous driving control.

The recommended return pointer P15 is an image showing the position on the first path RT1 at which return to autonomous driving control is recommended (return recommendation position). For example, the recommended return pointer P15 may be an image different from the first pointer-constituents P11, P12, and P13, and the first predicted stop pointer P14. A shape of the recommended return pointer P15 can be, for example, a quadrangle.

"Recommend return to the autonomous driving control" means, for example, causing a driver to recognize a timing at which a return manipulation is to be performed in order to deactivate the override state and smoothly return to the autonomous driving control in a state in which the state is shifted to the override state. The return manipulation of the driver includes, for example, a manipulation for pushing a return button for autonomous driving control, and a manipulation for pushing a start button for autonomous driving control. For example, by causing the position of the vehicle V on the first path RT1 at which smooth return to the autonomous driving control is possible to be displayed as the recommended return pointer P15 on the display device 31, such that the driver can be caused to recognize the timing at which the return manipulation is to be performed.

"Smooth return to autonomous driving control" includes, for example, that a variation in the traveling state of the vehicle V when the override state is deactivated and return (transition) to autonomous driving control is performed is suppressed to a certain level or less. The certain level can be, for example, a level of the acceleration of the vehicle V or the steering angular velocity so that an occupant (including the driver) of the vehicle V does not feel uncomfortable due to the variation in the traveling state of the vehicle V.

The display control unit 16D calculates a recommended return position which is a position on the first path RT1 at which return to the autonomous driving control is recommended based on the first path RT1 and the second path RT2 when the intervening driving manipulation recognition unit 12 has recognized the intervention in the driving manipulation during the autonomous driving control. For example, the display control unit 16D determines whether or not the predicted position of the vehicle V on the first path RT1 at a certain future time is within a predetermined distance threshold value with respect to the second path RT2 when the intervention in the driving manipulation during the autonomous driving control is recognized by the intervening driving manipulation recognition unit 12. The display control unit 16D calculates the predicted position as the recommended return position when the display control unit 16D determines that the predicted position is within the predetermined distance threshold value with respect to the second path RT2. Further, the display control unit 16D may calculate the predicted position as the recommended return position when the predicted vehicle speed of the vehicle V on the first path RT1 at a certain future time is within a predetermined speed threshold value with respect to the vehicle speed set according to the vehicle speed plan of the autonomous driving control.

The display control unit 16D may set the predicted position on the first path RT1 at which the distance in a lane width direction (a lateral direction) between the first path RT1 and the second path RT2 is within a predetermined distance threshold value regardless of the future time, as the recommended return position. The display control unit 16D may set the predicted position on the first path RT1 at which the distance in the lane width direction between the first path RT1 and the second path RT2 is within the predetermined distance threshold value, which is the predicted position when a vehicle speed condition is satisfied, as the recommended return position. The vehicle speed condition is satisfied when the difference between the vehicle speed of the vehicle V at the predicted position (or the current speed of the vehicle V) and the vehicle speed on the vehicle speed plan at the predicted position of the second path RT2 nearest to such a predicted position is within a predetermined speed threshold value. Further, the display control unit 16D may cause the display device 31 to display a plurality of recommended return pointers or may cause the display device 31 to display a linear recommended return pointer.

[Display Example of Display Device 1D]

Figure 22:
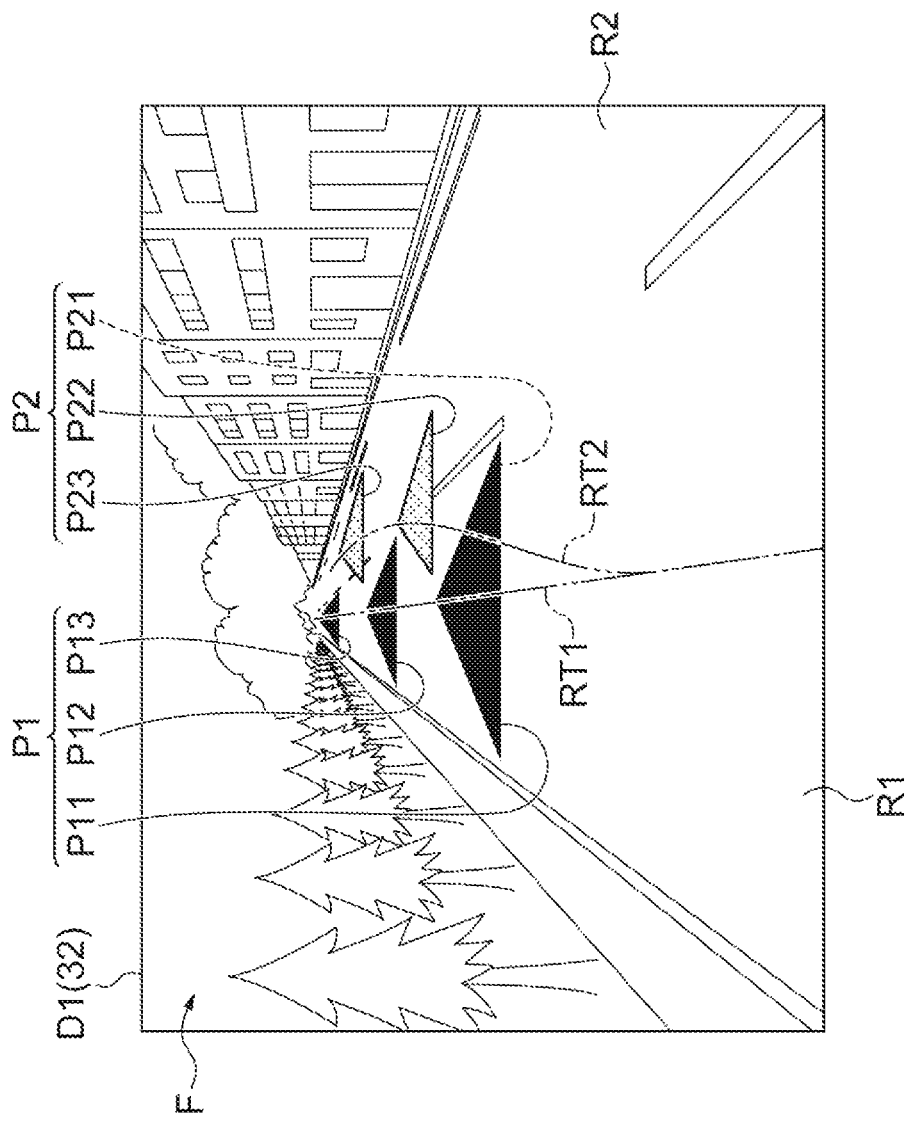
FIG. 22 illustrates an example of a display on an AR-HUD by the display device of FIG. 21.
Figure 23:
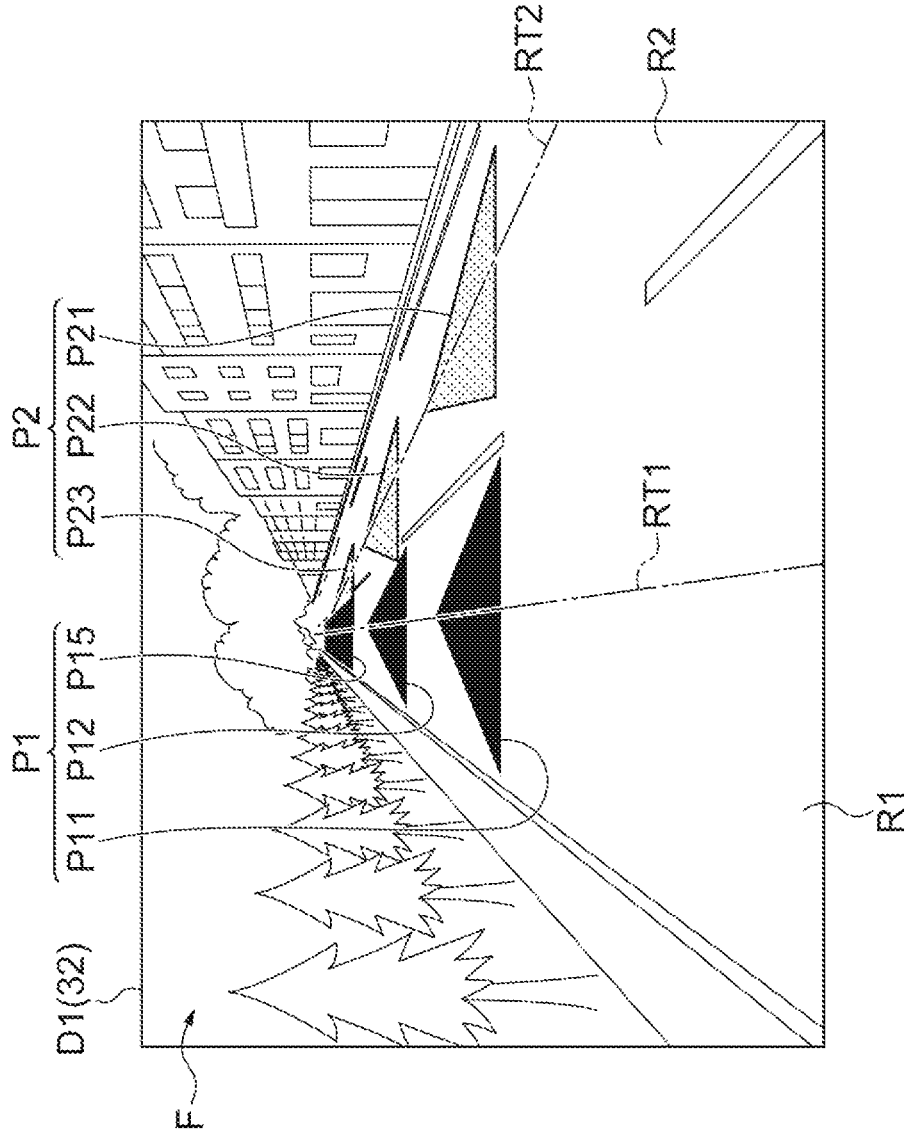
FIG. 23 is a display example showing a situation following the display example of FIG. 22.
Figures 24A, 24B:
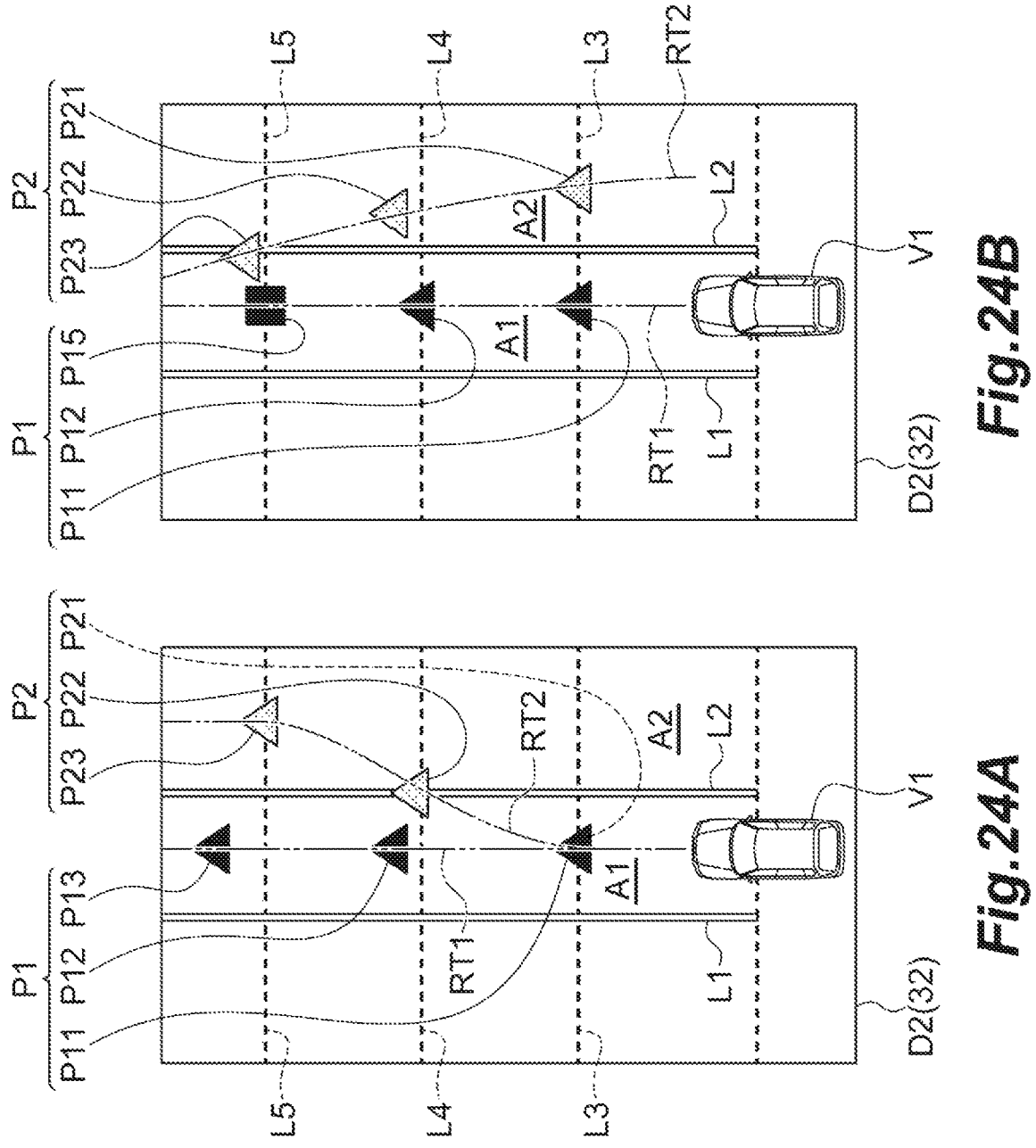
FIG. 24A illustrates an example of a display on the MID in the display device of FIG. 21.
FIG. 24B is a display example showing a situation following the display example of FIG. 24A.

Here, FIG. 22 illustrates an example of a display on the AR-HUD in the display device 1D. FIG. 23 is a display example showing a situation following the display example of FIG. 22. FIG. 24A illustrates an example of a display on the MID in the display device 1D. FIG. 24B is a display example showing a situation following the display example of FIG. 24A.

In the example illustrated in FIG. 22 to FIG. 24B, as an example, a situation in which the driver intervenes in the driving manipulation so that the first path RT1 stays in the travel lane R1 (so as not to let the vehicle V change the lane) when the trajectory is a trajectory of the second path RT2 in which lane change from the travel lane R1 to the adjacent lane R2 is performed and lane change from the adjacent lane R2 to the travel lane R1 is performed through autonomous driving control will be described.

FIG. 22 illustrates a situation in which the intervention in the driving manipulation has been recognized by the intervening driving manipulation recognition unit 12 when lane change from the travel lane R1 to the adjacent lane R2 is to be performed during autonomous driving control. In this situation, the first pointer-constituents P11, P12, and P13 and the second pointer-constituents P21, P22, and P23 are superimposed on the foreground landscape F and displayed on the display device 31. Specifically, the first pointer-constituents P11, P12, and P13 are displayed in the main-display-manner to stay on the travel lane R1 along the first path RT1. The second pointer-constituents P21, P22, and P23 are displayed in a sub-display-manner to move from the travel lane R1 to the adjacent lane R2 along the second path RT2.

FIG. 23 illustrates a situation in which lane change from the adjacent lane R2 to the travel lane R1 is assumed as the trajectory for the autonomous driving control in the override state due to the intervention in the driving manipulation. In this situation, the second pointer-constituents P21, P22, and P23 are displayed in a sub-display-manner to move from the adjacent lane R2 to the travel lane R1 along the second path RT2. Here, for example, it is determined that the position of the first pointer-constituent P13 is in a predetermined distance threshold value with respect to the position of the second pointer-constituent P23, and the recommended return pointer P15 is superimposed on the foreground landscape F and displayed on the display device 31 instead of the first pointer-constituent P13.

Subsequently, a display example when the display device 31 in the situation illustrated in FIGS. 8 and 9 is an MID as illustrated in FIGS. 24A and 24B will be described.

First, FIG. 24A illustrates a situation in which the intervention in the driving manipulation has been recognized by the intervening driving manipulation recognition unit 12 when lane change from the travel lane R1 to the adjacent lane R2 is to be performed during autonomous driving control. In this situation, the first pointer-constituents P11, P12, and P13 and the second pointer-constituents P21, P22, and P23 are displayed on the display device 31. Specifically, the first pointer-constituents P11, P12, and P13 are displayed in the main-display-manner to stay on the travel lane R1 along the first path RT1. The second pointer-constituents P21, P22, and P23 are displayed in a sub-display-manner to move from the travel lane R1 to the adjacent lane R2 along the second path RT2.

FIG. 24B illustrates a situation in which lane change from the adjacent lane R2 to the travel lane R1 is assumed as the trajectory for the autonomous driving control in the override state due to the intervention in the driving manipulation. In this situation, the second pointer-constituents P21, P22, and P23 are displayed in a sub-display-manner to move from the adjacent lane R2 to the travel lane R1 along the second path RT2. Here, for example, it is determined that the position of the first pointer-constituent P13 is in a predetermined distance threshold value with respect to the position of the second pointer-constituent P23, and the recommended return pointer P15 is displayed on the display device 31 instead of the first pointer-constituent P13.

[Display Control Process of Display Device 1D]

Figure 25:
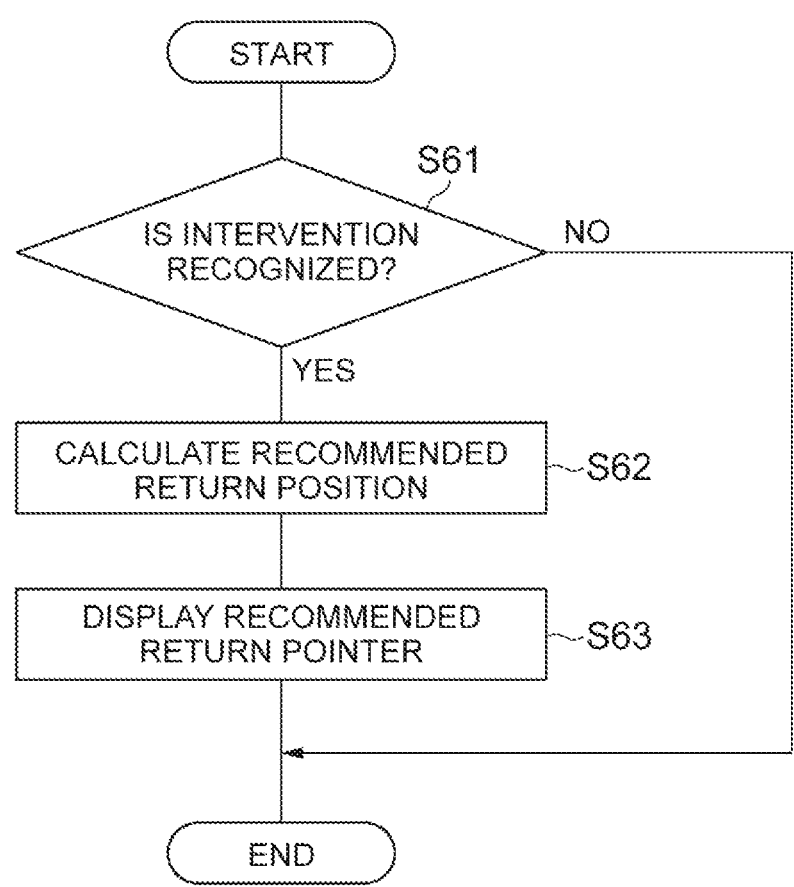
FIG. 25 is a flowchart illustrating a process of the display device of FIG. 21.

Hereinafter, display control of the display device 1D corresponding to the display examples of FIGS. 22 to 24B described above will be described. FIG. 25 is a flowchart illustrating a display control process of the display device 1D. The display control process illustrated in FIG. 25 is executed when the autonomous driving control of the autonomous driving system 2 is started, and is stopped when the autonomous driving control ends.

As illustrated in FIG. 25, the ECU 10D of the display device 1D determines whether or not intervention in the driving manipulation is recognized using the display control unit 16D in S61. The display control unit 16D determines whether or not the intervention in the driving manipulation during the autonomous driving control is recognized based on a recognition result of the intervening driving manipulation recognition unit 12. When the display control unit 16D determines that the intervention in the driving manipulation during the autonomous driving control is not recognized in S61 (S61: NO), the ECU 10D ends the process of FIG. 25.

In S61, when the display control unit 16D determines that the intervention in the driving manipulation during the autonomous driving control has been recognized (S61: YES), the ECU 10D performs calculation of the recommended return position using the display control unit 16D in S62. The display control unit 16D calculates the recommended return position that is a position on the first path RT1 at which return to the autonomous driving control is recommended based on the first path RT1 and the second path RT2. The display control unit 16D may omit the calculation of the recommended return position in some cases.

In S63, the ECU 10D performs a display of the recommended return pointer P15 using the display control unit 16D. The display control unit 16D causes the recommended return pointer P15 indicating the recommended return position to be displayed on the display device 31. When the calculation of the recommended return position has been omitted, the display control unit 16D may omit the display of the recommended return pointer P15. Thereafter, the ECU 10D ends the process of FIG. 25.

[Working of Display Device 1D]

With the display device 1D according to the fourth embodiment described above, the display control unit 16D causes the recommended return pointer P15 indicating the recommended return position on the first path RT1 at which the return to the autonomous driving control is recommended to be displayed on the display device 31, based on the first path RT1 and the second path RT2, when the intervening driving manipulation recognition unit 12 has recognized the intervention in the driving manipulation during the autonomous driving control. Accordingly, the driver can easily comprehend the position on the first path RT1 at which the vehicle can smoothly return to the autonomous driving control, for example.

[Modification Examples of Display Device]

Several embodiments of the present disclosure have been described above, but the present disclosure is not limited to the above-described embodiments. The present disclosure can be implemented in various aspects in which various modifications or improvements have been performed based on the knowledge of those skilled in the art, including the above-described embodiments.

In the first embodiment, the display device 1A may constitute a part of the autonomous driving system 2. In this case, the ECU 10A may be a part of the autonomous driving ECU 3. The same applies to other embodiments. Although the aspect in which the display device 1A performs both the display control process in FIG. 11 and the display control process in FIG. 12 has been described in the first embodiment, an aspect in which the display control process in FIG. 12 is omitted may be adopted.

Although the aspect in which the display device 1C performs both the display control process in FIG. 19 and the display control process in FIG. 20 has been described in the third embodiment, an aspect in which one of the display control processes is omitted may be adopted.

In the first embodiment, the main-display-manner before the intervention in the driving manipulation is recognized may not necessarily be the same as the main-display-manner after the intervention in the driving manipulation has been recognized, when the intervention in the driving manipulation during the autonomous driving control is recognized by the intervening driving manipulation recognition unit 12. For example, in FIGS. 2 and 3, the display manner of the first pointer-constituents P11, P12, and P13 in FIG. 3 is not necessarily the same as the display manner of the second pointer-constituents P21, P22, and P23 in FIG. 2.

The first pointer-constituents do not necessarily correspond to the predicted positions on the first path of the vehicle V at a plurality of future times, respectively. A plurality of first pointer-constituents may be simply aligned and disposed on the first path. In this case, the display control unit 16A causes the plurality of first pointer-constituents to be displayed so that the intervals between the plurality of first pointer-constituents are shortened according to the manipulation-amount of the decelerating manipulation (for example, the amount of depression of the brake pedal) or the deceleration of the vehicle V, when the intervention in the driving manipulation during the autonomous driving control is recognized by the intervening driving manipulation recognition unit 12 and the driving manipulation is the decelerating manipulation. The display control unit 16A causes the plurality of first pointer-constituents to be displayed so that the intervals between the plurality of first pointer-constituents are lengthened according to the manipulation-amount of the accelerating manipulation (for example, the amount of depression of the accelerator pedal) or the acceleration of the vehicle V, when the intervention in the driving manipulation during the autonomous driving control is recognized by the intervening driving manipulation recognition unit 12 and the driving manipulation is the accelerating manipulation.

The display manner of the first pointer P1 may be the same as the display manner of the second pointer P2. For example, in FIG. 3, the display manner of the first pointer-constituents P11, P12, and P13 may be the same as the display manner of the second pointer-constituents P21, P22, and P23.

Although the first pointer-constituents P11, P12, and P13 and the second pointer-constituents P21, P22, and P23 are illustrated to have the same shape (triangle), the first pointer-constituents P11, P12, and P13 and the second pointer-constituents P21, P22, and P23 may have different shapes.

Although the first pointer P1 is displayed on the display device 31 as the first pointer-constituents P11, P12, and P13 aligned along the first path RT1, another image can be used when the image is an image showing the first path RT1. For example, the first pointer P1 may be a linear or curved figure extending along the first path RT1 or may be an arrow-shaped figure indicating the direction of the first path RT1.

Although the second pointer P2 is displayed on the display device 31 as the second pointer-constituents P21, P22, and P23 aligned along the second path RT2, another image can be used when the image is an image showing the second path RT2. For example, the second pointer P2 may be a linear or curved figure extending along the second path RT2 or may be an arrow-shaped figure indicating the direction of the second path RT2.

The first to fourth embodiments and modification examples thereof can be optionally combined with each other.

What is claimed is:

1. A display device for an autonomous driving system of a vehicle, comprising:

a processor configured to:

acquire a traveling state of the vehicle;

acquire a trajectory for the vehicle to travel along according to an autonomous driving control by the autonomous driving system;

detect a manual intervention during the autonomous driving control, that corresponds to at least one of a steering angle set by an operator of the vehicle on a steering device of the vehicle, or a pedal position set by the operator on a pedal of the vehicle, as a manual driving manipulation performed by the operator of the vehicle;

initiate an override state in response to detecting the manual intervention, wherein the manual driving manipulation by the operator overrides the autonomous driving control, to change at least one of a driving direction or a driving speed of the vehicle relative to the trajectory of the autonomous driving control; and in response to initiating the override state, generate a first path that is predicted for the vehicle to travel along and that is calculated based on the traveling state and the manual driving manipulation; and a display screen configured to, in response to initiating the override state, display the first path that has been calculated and a second path corresponding to the trajectory associated with the autonomous driving control, in a spatial relationship with a current position of the vehicle, so that the at least one of the steering angle or the pedal position set by the operator prompts the first path to appear for a first time on the display screen.

2. The display device according to claim 1, wherein the display screen is an augmented reality head-up display (AR HUD) that is configured to display the first path and the second path to be superimposed on a foreground landscape showing a situation in front of the vehicle.

3. The display device according to claim 1, wherein the display screen is further configured to:

display the first path as at least one first pointer corresponding to one or more predicted positions of the vehicle that are calculated in response to a manipulation-amount of the manual driving manipulation; and display the second path as at least one second pointer corresponding to one or more predetermined positions along the second path based on the autonomous driving control, wherein the first path displayed is highlighted relative to the second path so that the first path is displayed as a main display and the second path is displayed as a sub-display.

4. The display device according to claim 3, wherein the processor is further configured to recalculate the first path to be displayed based on a current manual driving manipulation, during the override state, wherein the at least one first pointer is displayed as a plurality of first pointer-constituents arranged along the first path, and wherein distances between adjacent pairs of the first pointer-constituents vary according to a speed change caused by the manipulation-amount of the current manual driving manipulation, so as to graphically represent a predicted acceleration or deceleration of the vehicle along the first path.

5. The display device according to claim 4, wherein the at least one second pointer is displayed as a plurality of second pointer-constituents arranged along the second path, and wherein distances between adjacent pairs of the second pointer-constituents vary according to a speed change that is planned by the autonomous driving control, so as to graphically represent an acceleration or a deceleration along the second path.

6. The display device according to claim 5, wherein the distances between the adjacent pairs of the first pointer-constituents is greater than the distances between the adjacent pairs of the second pointer-constituents, in response to predicting a greater acceleration of the vehicle along the first path relative to the second path associated with the autonomous driving control, and wherein the distances between the adjacent pairs of the first pointer-constituents is shorter than the distances between the adjacent pairs of the second pointer-constituents, in response to predicting a greater deceleration of the vehicle along the first path relative to the second path associated with the autonomous driving control.

7. The display device according to claim 3, wherein the at least one first pointer includes a first predicted stop pointer indicating a position along the first path where the vehicle is predicted to stop based on the manual driving manipulation, and wherein the at least one second pointer includes a second predicted stop pointer indicating a stop position along the second path, that is planned by the autonomous driving control.

8. The display device according to claim 1, wherein the processor is further configured to:

acquire a degree of system confidence of the autonomous driving control from the autonomous driving system, and change a display manner of the second path according to the degree of system confidence.

9. The display device according to claim 1, wherein the processor is further configured to detect a threshold time that has elapsed after detecting the manual intervention, and wherein the display screen is further configured to decrease a degree of visual emphasis of the second path after the threshold time has elapsed.

10. The display device according to claim 1, wherein the processor is further configured to calculate a return position on the first path at which the override state is recommended to be ended, based on the first path and the second path, and wherein the display screen is further configured to display a return pointer along the first path, that represents the return position calculated.

11. The display device according to claim 1, wherein the steering angle of the steering device to detect the manual intervention is caused by a steering movement performed by the operator on the steering device, or by a holding of the steering device at a given angular position against a rotational force applied by the autonomous driving control.

12. The display device according to claim 11, wherein the manual intervention is detected when a rotational steering force applied by the operation on the steering device, or a difference between the angular position and a target angle based on the autonomous driving system, reaches a threshold amount.

13. The display device according to claim 11, wherein while the override state is deactivated, both the driving direction and the driving speed are controlled by the autonomous driving control, and wherein during the override state, the driving direction of the vehicle is responsive to the manual driving manipulation, and the driving speed of the vehicle remains controlled by the autonomous driving control.

14. The display device according to claim 1, wherein the display screen is configured to:

display the first path ahead of the current position of the vehicle during the override state; and display the second path associated with the autonomous driving control, without displaying the first path while the override state is deactivated, and wherein the processor is configured to detect the manual intervention while the override state is deactivated during which the second path is displayed without the first path.

15. An image display method for an autonomous driving system of a vehicle, comprising:

acquiring a traveling state of the vehicle;

acquiring a trajectory for the vehicle to travel along according to an autonomous driving control by the autonomous driving system;

detecting a manual intervention during the autonomous driving control, that corresponds to at least one of a steering position set by an operator of the vehicle on a steering device of the vehicle, or a position of a speed-control lever of the vehicle set by the operator, as a manual driving manipulation performed by the operator of the vehicle;

initiating an override state in response to detecting the manual intervention, wherein the manual driving manipulation by the operator overrides the autonomous driving control, to change at least one of a driving direction or a driving speed of the vehicle relative to the trajectory of the autonomous driving control; and in response to initiating the override state:

generate a first path starting at a current position of the vehicle, that is predicted for the vehicle to travel along and that is calculated based on the traveling state and on the at least one of the driving direction or the driving speed associated with the manual driving manipulation;

displaying the first path that has been calculated and a second path corresponding to the trajectory associated with the autonomous driving control in a spatial relationship with the current position of the vehicle, so that the manual driving manipulation prompts the first path to appear for a first time on the display screen together with the second path;

recalculating the first path during the override state, based on a current traveling state and a current manual driving manipulation; and displaying the first path that has been recalculated to dynamically update a display of at least one of a direction of the first path or a speed that is predicted for the vehicle along the first path.

16. The method according to claim 15, wherein the first path and the second path are displayed on an augmented reality head-up display (AR HUD) to be superimposed on a foreground landscape showing a situation in front of the vehicle.

17. The method according to claim 15, wherein the first path is displayed as at least one first pointer corresponding to one or more predicted positions on the first path of the vehicle at respective one or more future times separated by a predetermined time interval, wherein the one or more predicted positions are calculated based on a manipulation-amount of the manual driving manipulation, and wherein the at least one first pointer includes a return pointer that represents a return position at which the override state is recommended to be ended, wherein the second path is displayed as at least one second pointer corresponding to one or more planned positions on the second path at the one or more future times, and wherein the first path is displayed as a main display and the second path is displayed as a sub-display.

18. The method according to claim 17, wherein the at least one first pointer is displayed as a plurality of first pointer-constituents aligned along the first path, wherein the plurality of first pointer-constituents is caused to be displayed so that an interval between the plurality of first pointer-constituents decreases according to the manipulation-amount of a decelerating manipulation or a deceleration of the vehicle when the current manual driving manipulation of the operator is the decelerating manipulation, and wherein the plurality of first pointer-constituents is caused to be displayed so that the interval between the plurality of first pointer-constituents increases according to the manipulation-amount of an accelerating manipulation or an acceleration of the vehicle when the current manual driving manipulation of the operator is the accelerating manipulation.

19. The method according to claim 17, wherein the at least one first pointer includes a first predicted stop pointer indicating a first predicted stop position that is displayed when the manual driving manipulation of the operator is a decelerating manipulation, wherein the first predicted stop position is a predicted stop position of the vehicle when the manipulation-amount of a decelerating manipulation is maintained, and wherein the at least one second pointer includes a second predicted stop pointer indicating a second predicted stop position that is a planned stop position by the autonomous driving control.

20. The method according to claim 17, wherein the at least one first pointer is displayed as a plurality of first pointer-constituents aligned along the first path, wherein the at least one second pointer is displayed as a plurality of second pointer-constituents aligned along the second path, and wherein the plurality of first pointer-constituents and the plurality of second pointer-constituents are caused to be displayed so that an interval between the plurality of first pointer-constituents is greater than an interval between the plurality of second pointer-constituents, when the manual intervention of an accelerating manipulation by the operator to accelerate the vehicle corresponds to an acceleration that is greater than an acceleration planned by the autonomous driving control.

21. The method according to claim 17, wherein the at least one first pointer is displayed as a plurality of first pointer-constituents aligned along the first path, wherein the at least one second pointer is displayed as a plurality of second pointer-constituents aligned along the second path, and wherein the plurality of first pointer-constituents and the plurality of second pointer-constituents are caused to be displayed so that an interval between the plurality of first pointer-constituents is shorter than an interval between the plurality of second pointer-constituents, when the manual intervention of a decelerating manipulation by the operator to decelerate the vehicle corresponds to a deceleration that is greater than a deceleration planned by the autonomous driving control.

22. The method according to claim 15, further comprising:

acquiring a degree of system confidence of the autonomous driving control from the autonomous driving system, and changing a display manner of the second path according to the degree of system confidence.

23. The method according to claim 15, wherein during the override state in which the first path and the second path are displayed, when a predetermined time has elapsed since the manual intervention has been detected, the second path is displayed with a lesser emphasis-degree than before the predetermined time has elapsed.

24. The method according to claim 15, wherein the steering position set by the operator is caused by a rotational movement of the steering device, or by a holding of the steering device at a given angular position against a rotational force applied by the autonomous driving control.

* * * * *